US012594877B2

(12) United States Patent
Barrellon et al.

(10) Patent No.: US 12,594,877 B2
(45) Date of Patent: Apr. 7, 2026

(54) AUTOMATIC TURN SIGNAL CANCELLATION IN A VEHICLE FOR A ROUNDABOUT

(71) Applicant: Volvo Truck Corporation, Gothenburg (SE)

(72) Inventors: Remi Barrellon, Simandres (FR); Oriana Gonzalez Mosquera, Lyons (FR); David De Brito, Charvieu-Chavagneux (FR)

(73) Assignee: Volvo Truck Corporation, Gothenburg (SE)

( * ) Notice: Subject to any disclaimer, the term of this patent is extended or adjusted under 35 U.S.C. 154(b) by 12 days.

(21) Appl. No.: 18/811,571

(22) Filed: Aug. 21, 2024

(65) Prior Publication Data

US 2025/0170951 A1 May 29, 2025

(30) Foreign Application Priority Data

Nov. 24, 2023 (EP) ..................................... 23212002

(51) Int. Cl.
B60Q 1/34 (2006.01)
G06V 20/56 (2022.01)

(52) U.S. Cl.
CPC ............ B60Q 1/346 (2013.01); G06V 20/588 (2022.01)

(58) Field of Classification Search
CPC ............................... B60Q 1/346; G06V 20/588
See application file for complete search history.

(56) References Cited

U.S. PATENT DOCUMENTS 6,975,218 B2 * 12/2005 Madau ..................... B60Q 1/40
340/475
11,772,646 B2 * 10/2023 Fujita .................... B60W 50/12
701/1
(Continued)

FOREIGN PATENT DOCUMENTS

CN 112399932 B * 10/2024 ............ B60W 50/12
DE 102011085822 A1 * 5/2013 ............... B60Q 1/40
(Continued)

OTHER PUBLICATIONS

Extended European Search Report for European Patent Application No. 23212005.5, mailed Apr. 17, 2024, 7 pages.
(Continued)

*Primary Examiner* — Adam D Houston
(74) *Attorney, Agent, or Firm* — Withrow & Terranova, PLLC

(57) ABSTRACT

Automatic turn signal cancellation in a vehicle for a roundabout is disclosed. The automatic turn signal cancellation system is configured to not prematurely cancel a turn signal until the exit of the roundabout is confirmed. A first turn signal activation in an opposite direction of a first turn is detected to signify possible entry into a roundabout. Automatic cancellation of the first turn signal is delayed in response to detecting remaining within the roundabout based on the detected vehicle turning pattern. This can prevent the driver having to again activate the first turn signal within the roundabout. Detection of subsequent activation of a second turn signal opposite of the first turn signal direction may signify exiting the roundabout. The second turn signal is cancelled if the vehicle is detected to return to a turn neutral position steering direction for a defined period of time signifying completion of roundabout exit.

20 Claims, 12 Drawing Sheets

(56) References Cited

U.S. PATENT DOCUMENTS

| | | | |
|---|---|---|---|
| 12,377,776 B2 * | 8/2025 | Pendleton | B60Q 1/346 |
| 2010/0013624 A1 | 1/2010 | Groeller et al. | |
| 2010/0219051 A1 | 9/2010 | Shimizu et al. | |
| 2010/0308988 A1 | 12/2010 | Ieda et al. | |
| 2015/0210208 A1 | 7/2015 | Suzuki | |
| 2016/0129831 A1 | 5/2016 | Liotti et al. | |
| 2020/0122632 A1 | 4/2020 | Nojiri et al. | |
| 2021/0268957 A1 * | 9/2021 | Fujita | B60Q 1/42 |
| 2022/0118903 A1 | 4/2022 | Cristini et al. | |
| 2025/0170951 A1 * | 5/2025 | Barrellon | B60Q 1/346 |
| 2025/0170952 A1 * | 5/2025 | Barrellon | B60Q 1/40 |
| 2025/0319814 A1 * | 10/2025 | Graham | B60Q 1/346 |

FOREIGN PATENT DOCUMENTS

| | | | | | |
|---|---|---|---|---|---|
| DE | 102023115824 A1 * | 12/2024 | | B60W 30/18145 |
| EP | 2815921 A1 | 12/2014 | | |
| EP | 4559752 A1 * | 5/2025 | | B60Q 1/346 |
| EP | 4559753 A1 * | 5/2025 | | B60Q 1/42 |
| EP | 202241069133 A * | 5/2025 | | |
| FR | 2967376 A1 | 5/2012 | | |
| JP | 2003252112 A | 9/2003 | | |
| JP | 2006321347 A | 11/2006 | | |
| JP | 2011131631 A | 7/2011 | | |
| JP | 5399884 B2 * | 1/2014 | | |
| JP | 5576087 B2 | 8/2014 | | |
| JP | 2017109657 A * | 6/2017 | | |
| JP | 6538540 B2 * | 7/2019 | | |
| WO | 2008125392 A1 | 10/2008 | | |
| WO | WO-2020012212 A1 * | 1/2020 | | H04W 4/46 |
| WO | WO-2020012214 A1 * | 1/2020 | | H04W 4/46 |
| WO | WO-2020173543 A1 * | 9/2020 | | B60K 35/10 |
| WO | WO-2021131392 A1 * | 7/2021 | | B60W 60/005 |

OTHER PUBLICATIONS

Extended European Search Report for European Patent Application No. 23212002.2, mailed Apr. 16, 2024, 10 pages.

Examination Report for European Patent Application No. 23212002.2, mailed Feb. 9, 2026, 6 pages.

* cited by examiner

AUTOMATIC TURN SIGNAL CANCELLATION IN A VEHICLE FOR A ROUNDABOUT

PRIORITY APPLICATIONS

The present application claims priority to European Patent Application No. 23212002.2, filed on Nov. 24, 2023, and entitled "AUTOMATIC TURN SIGNAL CANCELLATION IN A VEHICLE FOR A ROUNDABOUT," which is incorporated herein by reference in its entirety.

TECHNICAL FIELD

The disclosure relates generally to turn signaling operation in vehicles. In particular aspects, the disclosure relates to automatic turn signal cancellation in a vehicle for a roundabout. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Vehicles that operate on any public road must be equipped with turn signals. Turn signals indicate a left or right turn by providing a flashing light signal at the rear and front of the vehicle. The turn signals (also referred to as just "turn signal") can be controlled by a driver of a vehicle to indicate an intention to turn, change lanes, or merge into traffic. A vehicle typically has a turn signal stalk as a turn signal activator that is configured to be activated by a driver to activate the left and right turn signal. A driver can activate a left or right turn signal on a vehicle by activating the turn signal stalk, which is in effect a multi-position switch. For example, for a driver to activate a right turn signal using a turn signal stalk, the turn signal stalk is pushed up to the right, or clockwise, into a right turn signal switch position. Similarly, for a driver to activate a left turn signal using a turn signal stalk, the turn signal stalk is pushed down to the left, or counter-clockwise, into a left turn signal switch position. Some turn signal systems have intermediate switch positions that are momentary such that when activated, the turn signal stalk automatically and immediately returns to its neutral, non-activated position independent of whether a turn is completed. The selected turn signals are activated only for a programmed or pre-programmed number of blinks. However, when a turn signal stalk is moved into a full turn switch position, the turn signal stalk typically remains in the turn switch position until purposefully de-activated. For example, the turn signal stalk can be manually returned by the driver to a neutral switch position to cancel the turn signal. However, most vehicles also have an automatic turn signal cancellation system that automatically cancels or deactivates turns signals after a turn is completed. The automatic turn signal cancellation system can be equipped to monitor a steering wheel angle to detect a turn and to also detect that a turn has completed, based on the steering wheel angle returning towards a turn neutral position. An automatic turn signal cancellation system enhances safety and driver convenience by ensuring that a turn signal is not left on unintentionally, which could potentially confuse other drivers.

Roundabouts present special challenges for automatic turn signal cancellation. In the example of a right-side driving country, a driver turns right to enter the roundabout and then immediately moves the steering wheel to the left to move counter-clockwise in the roundabout until the driver desires to exit the roundabout by turning right onto a roundabout spoke or exit. In the example of a right-side driving country, best or customary practices for turn signaling may be for a driver to activate their right turn signal when entering a roundabout if the driver's intention is to take the first exit out of the roundabout. In this instance, the driver's path will mimic a normal right-hand turn, because the driver will likely exit the roundabout to the right before the steering wheel returns back to or close to the turn neutral position due to turning the steering wheel towards the left to traverse the roundabout after the right turn entrance. In this case, the automatic turn signal cancellation system may be configured to more easily and accurately recognize turn completion after exiting the roundabout and cancel the right turn signal only after the roundabout is exited. However, when the driver's intention is to not take the first exit out of the roundabout, best or customary practices for turn signaling may be for a driver to activate their left turn signal when entering a roundabout, and then activate their right turn signal when indicating a right-side exit from the roundabout. In this case, the automatic turn signal cancellation system may prematurely cancel the left turn signal since the driver is immediately turning right to enter the roundabout. The left turn signal premature cancellation may confuse other drivers and/or cause the driver to have to reactivate the left turn signal within the roundabout.

SUMMARY

Exemplary aspects disclosed herein include automatic turn signal cancellation in a vehicle for a roundabout. A vehicle is equipped with a turn signal indicator that can be activated by a driver to activate turn signaling on the vehicle to provide a visual indication of intention of the driver. The driver can manually cancel a turn signal activation, but the vehicle is also equipped with an automatic turn signal cancellation system configured to automatically cancel previously-activated turn signaling (e.g., activated through a turn signal stalk) in response to detecting a vehicle turn is completed. It can be more difficult for the automatic turn signal cancellation system to not prematurely cancel a turn signal in a roundabout, because of the variation in roundabout patterns and because the driver may use different types of signaling for entry and exiting of the roundabout depending on local driving customs. Premature turn signal cancellation may be based on mistakenly identifying different steering directions between entering and remaining within the roundabout as completion of a turn.

In this regard, in exemplary aspects, to avoid premature cancellation of a first turn signal used to signify entering a roundabout and to also automatically cancel a turn signal when the roundabout is truly exited, the automatic turn signal cancellation system is configured to detect a turn signaling pattern with certain vehicle turning that may indicate a roundabout driving pattern. This reduces the chances of or avoids premature turn signal cancellation in the roundabout. The automatic turn signal cancellation system is configured to detect a turn signaling pattern that includes activation of a first turn signal opposite of a first turn direction that may signify entering a roundabout. For example, in a right-side driving country, if the driver does not intend to take the first exit out of a roundabout, the driver may activate the left turn signal when entering the roundabout and then activate the right turn signal when exiting the roundabout, and vice versa. The automatic turn signal cancellation system is then configured to detect the vehicle turning in the direction of the first turn signal that may signify remaining within the roundabout. Automatic cancellation of the first turn signal is delayed in response to detecting the vehicle remaining within the roundabout so that the turn signal remains active without the driver having to reactivate the first turn signal to signify intention to remain in the roundabout. The automatic turn signal cancellation system is then configured to detect activation of a second turn signal opposite of the first turn signal direction that may signify exiting the roundabout. The automatic turn signal cancellation system is then configured to detect the vehicle turning returning to approximately a turn neutral position within a stability time to signify exit completion from the roundabout, to then cancel the second turn signal. This can avoid the driver having to again activate the first turn signal within the roundabout based on the automatic turn signal cancellation mistakenly identifying different turns from entry, staying within, and exiting the roundabout as a completion of a turn. If the vehicle turning does not return to the turn neutral position within the first stability time, cancellation of the second turn signal is delayed as this may mean the vehicle has not yet exited the roundabout.

In an exemplary aspect, using a right-side driving country as an example, the automatic turn signal cancellation system can be configured to first detect a left turn signal activation by the driver (e.g., a moving the turn signal stalk to the left turn switch position). If the right turn signal was activated, the automatic turn signal cancellation system can operate to cancel the right turn signal based on detection of completion of a simple right turn without having to detect a roundabout since a simple right turn and roundabout exit are both right turns. However, with the left turn signal activated, this could be an indication that the driver plans to make a normal left turn, or it could be an indication that the driver is entering a roundabout and signaling an indication of exiting the roundabout beyond the first exit. The automatic turn signal cancellation system does not know at this point, and thus the automatic turn signal cancellation system is configured to not prematurely cancel the left turn signal at this time. The automatic turn signal cancellation system is then configured to detect the vehicle turning (e.g., based on a detected steering wheel angle or vehicle wheels angle exceeding a threshold angle, which may be dynamically set based on the speed of the vehicle). If a left turn is detected, this is an indication of a simple left turn, and the automatic turn signal cancellation system can operate as normal to cancel the left turn signal after the left turn is completed. However, if the automatic turn signal cancellation system detects a turn towards the right turn direction in the opposite direction of the initial left turn signal, the automatic turn signal cancellation system then detects if vehicle enters a first turn neutral position (e.g., the wheel angle enters a +/−1.0 radians first turn neutral angle window). If the vehicle remains stable in the first turn neutral position for a designated stability time, this means the right turn is completed and the left turn signal can be cancelled (e.g., the driver may have made a turn signal mistake, but the turn is completed in any regard). However, if the vehicle does not remain stable in the first turn neutral position after the right turn, indicating a turn towards the left turn direction (e.g., the wheel angle indicates a turn back to the left outside the first turn neutral angle window), this is an indication the vehicle may be in a roundabout.

In this case, if the driver then activates a right turn signal and then turns towards a right turn direction, this means that the vehicle may be exiting the roundabout. The automatic turn signal cancellation system can be configured to detect the vehicle entering a second turn neutral position (e.g., a steering wheel angle or wheels angle enters a +/−0.2 radian angle window) as a way to detect that the vehicle may turning to exit the roundabout. The second turn neutral angle window has a reduce radian width over the first turn neutral angle window in this example, because if the vehicle is truly in a roundabout at this point, the vehicle turn (e.g., a steering wheel angle and/or wheel angle) should be very close or move to a zero, neutral turn neutral position by the vehicle turning back from the roundabout turn direction to the exit turn direction. This prevents or reduces false detections of the vehicle being in a roundabout. The automatic turn signal cancellation system can then, thereafter, detect if the vehicle remains in the first turn neutral position (e.g., the steering wheel angle remains in a turn neutral angle window of +/−1 radian that may be larger than the second turn neutral angle window) for a second stability time (e.g., 1.5 seconds), signifying completion of the right turn after exiting the roundabout. If the automatic turn signal cancellation system detects the vehicle remaining in the first turn neutral position for the second stability time, the automatic turn signal cancellation system can cancel the right turn signal because of detecting completion of the right turn after exiting the roundabout. If however, the automatic turn signal cancellation system detects the vehicle not remaining in the third turn neutral position for the second stability time, cancellation of the right turn signal can be delayed as this may mean the vehicle has not yet exited the roundabout.

The automatic turn signal cancellation system can also be configured for a left-side driving country, for turn signal cancellation based on the above referenced criteria with discussed left turns/angles instead being right turns/angles, and right turns/angles instead being left turns/angles.

Also, in some right-side driving countries, it may be best or customary practices for the driver to activate a right turn signal to indicate the driver's intent to take either the first or the second exit out of a roundabout, and not just the first exit out of the roundabout. Or, the vehicle driver may have even forgot to activate any turn signal at all when entering a roundabout. In either instance, a turn signal that is opposite of the vehicle turn direction when entering the roundabout does not occur and thus cannot be detected as a way to detect a roundabout for turn signal cancellation as previously discussed above. However, because the exit that will be taken out of the roundabout may not require the initial right turn to enter the roundabout to continue soon after entering the roundabout (e.g., a second or later exit is taken, or the roundabout pattern is such that the first exit requires the driver to steer back to the left for a designated period of time), the steering wheel angle or wheels angle may not indicate the completion of a simple right turn that can be detected for cancelling a right turn signal if previously activated. This is because the change in steering wheel angle may indicate a steering back to the left to remain in the roundabout that is too small to be detected as a simple right turn to then automatically cancel a right turn signal.

Thus, in other exemplary aspects, an automatic turn signal cancellation system can be configured to automatically cancel a turn signal that is activated sometime between entering the roundabout and exiting the roundabout and that is in the same direction as the entry turn direction into the roundabout. In this example, the automatic turn signal cancellation system can be configured to detect a first vehicle turn in the second turn direction where a turn signal in the opposite, first turn direction has not been activated (i.e., either the first turn signal is not activated or the first turn signal in the same first turn direction was activated). As an example, the automatic turn signal cancellation system can be configured to detect the first vehicle turn by detecting the wheel angles of the vehicle exceeding a threshold angle. The automatic turn signal cancellation system can then detect if the vehicle enters the first turn neutral position (e.g., the wheels angle enters a first turn neutral angle window of +/−1 radian) as an indication that the vehicle was previously turning a different direction, such as would be the case in a roundabout before turning to exit. The automatic turn signal cancellation system then detects if a first turn signal is activated in the second turn direction opposite for the first turn direction of the first vehicle turn into the roundabout. In response to the first turn signal in the previous, first turn direction being activated, the automatic turn signal cancellation system then detects if the vehicle enters and remains in a third turn neutral position (e.g., steering wheel angle remains in a +/−1 radian turn neutral angle window) for a second stability time (e.g., 4 seconds). If so, the first turn signal is cancelled since it has been detected that the vehicle did not continue with the same, second turn direction to exit the roundabout as was used to enter the roundabout with the first vehicle turn, and instead the vehicle turns to the first turn direction to remain in the roundabout. In this instance, a previous turn signal in the same turn direction as the entry into the roundabout may have been activated by the driver prior to entering the roundabout. Otherwise, the first turn signal activated after entering the roundabout in the same turn direction as entry into the roundabout is not cancelled until either a simple turn in the same turn direction or subsequent roundabout exit in the same turn direction is detected as completed. This could be performed by the automatic turn signal cancellation system like previously described above to detect a simple turn completion.

In this manner, the automatic turn signal cancellation system can detect a simple turn to cancel a turn signal, such as if the driver did not activate the turn signal until exiting the roundabout. However, the automatic turn signal cancellation system can also detect a roundabout to delay cancellation of the turn signal until the roundabout has been exited and such that is compatible with a simple turn detection and cancellation.

In an example, using a right-side driving country as an example, the automatic turn signal cancellation system can be configured to detect a right vehicle turn in a right turn direction where a left turn signal in the opposite, left turn direction has not been activated (i.e., either the left turn signal is not activated or the right turn signal in the right turn direction was activated). As an example, the automatic turn signal cancellation system can be configured to detect the right vehicle turn by detecting the wheel angles of the vehicle exceeding a threshold angle. The automatic turn signal cancellation system can then detect if the vehicle enters the first turn neutral position (e.g., the wheels angle enters a first turn neutral angle window of +/−1 radian) as an indication that the vehicle was previously turning in a left turn direction, such as would be the case in a roundabout before turning to exit. The automatic turn signal cancellation system then detects if a right turn signal is activated in the right turn direction entry into the roundabout. In response to the right turn signal being activated, the automatic turn signal cancellation system then detects if the vehicle enters and remains in a third turn neutral position (e.g., steering wheel angle remains in a +/−1 radian turn neutral angle window) for a second stability time (e.g., 4 seconds). If so, the right turn signal is cancelled since it has been detected that the vehicle did not continue with the same, right turn direction to exit the roundabout as was used to enter the roundabout with the right vehicle turn, and instead the vehicle turns to the left turn direction to remain in the roundabout. In this instance, a previous, right turn signal may have been activated by the driver prior to entering the roundabout. Otherwise, the right turn signal activated after entering the roundabout is not cancelled until either a simple right turn or subsequent roundabout exit in the right turn direction is detected as completed. This could be performed by the automatic turn signal cancellation system like previously described above to detect a simple right turn completion.

The automatic turn signal cancellation system can also be configured for a left-side driving country, for left turn signal cancellation based on the above referenced criteria with discussed left turns/angles instead being right turns/angles, and right turns/angles instead being left turns.

In yet other exemplary aspects, the ability of the automatic turn signal cancellation system can also be configured to distinguish between a simple turn (e.g., a simple turn and/or roundabout as discussed above), as compared to highway turning for automatic turn signal cancellation. Highway turning is turning that does not necessarily involve sharp steering wheel angle changes, such as when a vehicle performs highway merging to enter a highway, highway lane changes, and highway exiting. This is because less steering wheel angle change is required to perform a turn at higher speeds than are generally present in highway driving, because the steering wheel angle change needed to perform a given turn is inversely related to vehicle speed due to increased centripetal force and inertia of a vehicle turn at higher speeds. Thus, in highway turning, the detection of vehicle turning direction used for detection of simple turns and/or roundabouts may not be significant enough to detect highway turning for automatic turn signal cancellation after the highway turn is completed. Thus, in exemplary aspects, to be able to cancel a turn signal after completion of a highway turn that is not detectable through steering wheel angle change, the automatic turn signal cancellation system can be configured to cancel the turn signal based on detecting the highway turn using a secondary turn detection system such as through a forward-looking camera. For example, the secondary turn detection system may be able to detect lane changes, highway exits, and highway merging when entering a highway as highway turns. Other methods of detecting a highway turn, such as through use of radar, lidar, can also be employed.

According to a first aspect of the disclosure, an automatic turn signal cancellation system is provided comprising processing circuitry configured to: detect activation of a first turn signal in a first turn direction in a vehicle; and in response to detecting activation of the first turn signal in the first turn direction: detect first turning of the vehicle towards a second turn direction opposite of the first turn direction; and in response to detecting the first turning of the vehicle towards the second turn direction: detect the vehicle entering a first turn neutral position relative to a neutral position of the vehicle; and in response to detecting the vehicle entering the first turn neutral position: detect activation of a second turn signal in the second turn direction; and in response to detecting the activation of the second turn signal in the second turn direction: detect the vehicle entering a second turn neutral position relative to the neutral position of the vehicle; and in response to detecting the vehicle entering the second turn neutral position: detect the vehicle remaining in the first turn neutral position for a first stability time; and in response to detecting the vehicle remaining in the first turn neutral position for the first stability time, cancel the second turn signal.

Optionally in some examples, including in at least one preferred example, the processing circuitry is further configured to not cancel the first turn signal in response to detecting the first turning of the vehicle towards the second turn direction.

Optionally in some examples, including in at least one preferred example, the processing circuitry is configured to detect the first turning of the vehicle towards the second turn direction by being configured to detect a wheel angle of the vehicle exceeding a threshold angle towards the second turn direction.

Optionally in some examples, including in at least one preferred example, the processing circuitry is further configured to, in response to detecting activation of the first turn signal in the first turn direction: detect a speed of the vehicle; and set the threshold angle based on the detected speed of the vehicle.

Optionally in some examples, including in at least one preferred example, the processing circuitry is configured to detect the vehicle entering the first turn neutral position by being configured to: detect a wheel angle of the vehicle crossing into a first turn neutral angle window relative to a neutral position of the wheel angle of the vehicle.

Optionally in some examples, including in at least one preferred example, the first turn neutral angle window is +/−1.0 radian relative to the neutral position of the wheel angle. \

Optionally in some examples, including in at least one preferred example, the processing circuitry is further configured to, in response to detecting activation of the first turn signal in the first turn direction: detect turning of the vehicle towards the first turn direction; and in response to detecting turning of the vehicle towards the first turn direction: detect the vehicle remaining in the first turn neutral position for the second stability time; and in response to the vehicle remaining in the first turn neutral position for the second stability time, cancel the first turn signal.

Optionally in some examples, including in at least one preferred example, the processing circuitry is configured to detect the vehicle entering the second turn neutral position by being configured to: detect a steering wheel angle of a steering wheel of the vehicle entering to a second turn neutral angle window relative to a neutral position of the steering wheel.

Optionally in some examples, including in at least one preferred example, the second turn neutral angle window is +/−0.2 radians relative to the neutral position of the steering wheel.

Optionally in some examples, including in at least one preferred example, the first stability time is 1.5 seconds.

Optionally in some examples, including in at least one preferred example, the processing circuitry is further configured to: detect the first turning of the vehicle towards the second turn direction before detecting the activation of the first turn signal; and in response to detecting the first turning of the vehicle towards the second turn direction before detecting the activation of the first turn signal: detect the vehicle entering the first turn neutral position; and in response to detecting the vehicle entering the first turn neutral position: detect activation of a third turn signal in the second turn direction; and in response to detecting activation of the third turn signal in the second turn direction: detect the vehicle entering a third turn neutral position relative to neutral position of the vehicle; and in response to detecting the vehicle entering the third turn neutral position: detect the vehicle remaining in the third turn neutral position for a third stability time; and in response to detecting the vehicle remaining in the third turn neutral position for the third stability time, cancel the third turn signal.

Optionally in some examples, including in at least one preferred example, the third stability time is four (4) seconds.

Optionally in some examples, including in at least one preferred example, the processing circuitry is further configured to, in response to detecting the steering wheel angle not remaining in the third turn neutral position for the third stability time, not cancel the third turn signal.

Optionally in some examples, including in at least one preferred example, the processing circuitry is configured to: detect the first turning of the vehicle towards the second turn direction by being configured to: detect a wheel angle of the vehicle exceeding a threshold angle towards the second turn direction; detect the vehicle entering the first turn neutral position by being configured to: detect a wheel angle of the vehicle entering the first turn neutral position comprising a first turn neutral angle window relative to a neutral position of the wheel angle of the vehicle; and detect the vehicle entering the third turn neutral position by being configured to: detect a steering wheel angle of the steering wheel of the vehicle entering the third turn neutral position relative to the neutral position of the steering wheel; and detect the vehicle remaining in the third turn neutral position for the third stability time by being configured to: detect the steering wheel angle remaining in the third turn neutral position for the third stability time.

Optionally in some examples, including in at least one preferred example, in response to activation of the first turn signal, the processing circuitry is further configured to: detect a highway turn by the vehicle while the vehicle is within a fourth turn neutral position; and in response to detecting the highway turn, cancel the first turn signal.

Optionally in some examples, including in at least one preferred example, the processing circuitry is configured to detect the highway turn by being configured to: receive at least one image from an imaging system; and determine whether the highway turn occurred based on the received at least one image.

Optionally in some examples, including in at least one preferred example, the imaging system comprises a forward-looking camera configured to capture images of a forward-looking perspective from the vehicle.

Optionally in some examples, including in at least one preferred example, the processing circuitry is configured to detect the highway turn by being configured to: receive turn data of the vehicle generated by a global-positioning system (GPS); and determine whether the highway turn occurred based on the received turn data.

Optionally in some examples, including in at least one preferred example, a vehicle is provided comprising the automatic turn signal cancellation system of examples provided herein.

Optionally in some examples, including in at least one preferred example, the vehicle further comprising a steering wheel angle sensor configured to generate a steering wheel angle signal indicative of the steering wheel angle of the steering wheel.

Optionally in some examples, including in at least one preferred example, a method is provided of automatically cancelling a turn signal for a vehicle from a roundabout, comprising: detecting, by a processing circuitry, activation of a first turn signal in a first turn direction in a vehicle; and in response to detecting, by the processing circuitry, activation of the first turn signal in the first turn direction: detecting, by the processing circuitry, first turning of the vehicle towards a second turn direction opposite of the first turn direction; and in response to detecting, by the processing circuitry, the first turning of the vehicle towards the second turn direction: detecting, by the processing circuitry, the vehicle entering a first turn neutral position relative to the neutral position of the steering wheel; and in response to detecting, by the processing circuitry, the vehicle entering the first turn neutral position: detecting, by the processing circuitry, activation of a second turn signal in the second turn direction; and in response to the processing circuitry detecting, by the processing circuitry, the activation of the second turn signal in the second turn direction: detecting, by the processing circuitry, the vehicle entering a second turn neutral position relative to the neutral position of the steering wheel; and in response to detecting, by the processing circuitry, the vehicle entering the second turn neutral position: detecting, by the processing circuitry, the vehicle remaining in the first turn neutral position for a first stability time; and in response to detecting, by the processing circuitry, the vehicle remaining in the first turn neutral position for the first stability time, cancelling, by the processing circuitry, the second turn signal.

Optionally in some examples, including in at least one preferred examples, the method further comprises: detecting, by the processing circuitry, the first turning of the vehicle towards the second turn direction before detecting the activation of the first turn signal; and in response to the detecting, by the processing circuitry, the first turning of the vehicle towards the second turn direction before detecting the activation of the first turn signal: detecting, by the processing circuitry the vehicle entering the first turn neutral position; and in response detecting, by the processing circuitry, the vehicle entering the first turn neutral position: detecting, by the processing circuitry activation of a third turn signal in the second turn direction; and in response detecting, by the processing circuitry, activation of the third turn signal in the second turn direction: detecting, by the processing circuitry the vehicle entering a third turn neutral position relative to the neutral position of the vehicle; and in response to detecting, by the processing circuitry, the vehicle entering the third turn neutral position: detecting, by the processing circuitry, the vehicle remaining in the third turn neutral position for a third stability time; and in response to detecting, by the processing circuitry, the vehicle remaining in the third turn neutral position for the third stability time, cancelling, by the processing circuitry, the third turn signal.

Optionally in some examples, including in at least one preferred example, in response to activation of the first turn signal, the method further comprises: detecting, by the processing circuitry, a highway turn by the vehicle while the vehicle is within a fourth turn neutral position; and in response to detecting, by the processing circuitry, the highway turn, cancelling, by the processing circuitry the first turn signal.

Optionally in some examples, including in at least one preferred example, a computer program product is provided comprising program code for performing, when executed by the processing circuitry, any of the methods described herein.

Optionally in some examples, including in at least one preferred example, a non-transitory computer-readable storage medium is provided comprising instructions, which, when executed by the processing circuitry, cause the processing circuitry to perform any of the methods described herein.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

Figure 1:
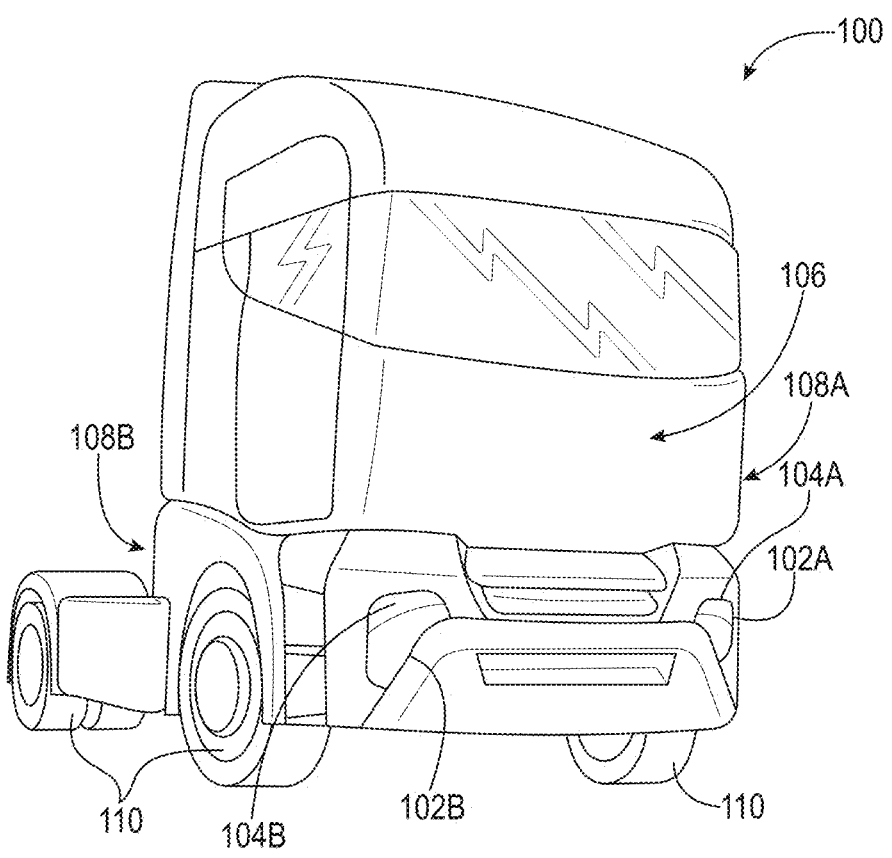
FIG. 1 is a side perspective view of an exemplary vehicle in the form of a truck that has turn signals configured to be manually activated by a turn signal activator (e.g., a turn signal stalk), and wherein the vehicle also has an automatic turn signal cancellation system configured to automatically cancel a turn signal based on detecting a completed turn.

The detailed description set forth below provides information and examples of the disclosed technology with sufficient detail to enable those skilled in the art to practice the disclosure.

Exemplary aspects disclosed herein include automatic turn signal cancellation in a vehicle for a roundabout. A vehicle is equipped with a turn signal indicator that can be activated by a driver to activate turn signaling on the vehicle to provide a visual indication of intention of the driver. The driver can manually cancel a turn signal activation, but the vehicle is also equipped with an automatic turn signal cancellation system configured to automatically cancel previously-activated turn signaling (e.g., activated through a turn signal stalk) in response to detecting a vehicle turn is completed. It can be more difficult for the automatic turn signal cancellation system to not prematurely cancel a turn signal in a roundabout, because of the variation in roundabout patterns and because the driver may use different types of signaling for entry and exiting of the roundabout depending on local driving customs. Premature turn signal cancellation may be based on mistakenly identifying different steering directions between entering and remaining within the roundabout as completion of a turn.

In this regard, in exemplary aspects, to avoid premature cancellation of a first turn signal used to signify entering a roundabout and to also automatically cancel a turn signal when the roundabout is truly exited, the automatic turn signal cancellation system is configured to detect a turn signaling pattern with certain vehicle turning that may indicate a roundabout driving pattern. This reduces the chances of or avoids premature turn signal cancellation in the roundabout. The automatic turn signal cancellation system is configured to detect a turn signaling pattern that includes activation of a first turn signal opposite of a first turn direction that may signify entering a roundabout. For example, in a right-side driving country, if the driver does not intend to take the first exit out of a roundabout, the driver may activate the left turn signal when entering the roundabout and then activate the right turn signal when exiting the roundabout, and vice versa. The automatic turn signal cancellation system is then configured to detect the vehicle turning in the direction of the first turn signal that may signify remaining within the roundabout. Automatic cancellation of the first turn signal is delayed in response to detecting the vehicle remaining within the roundabout so that the turn signal remains active without the driver having to reactivate the first turn signal to signify intention to remain in the roundabout. The automatic turn signal cancellation system is then configured to detect activation of a second turn signal opposite of the first turn signal direction that may signify exiting the roundabout. The automatic turn signal cancellation system is then configured to detect the vehicle turning returning to approximately a turn neutral position within a first stability time to signify exit completion from the roundabout, to then cancel the second turn signal. This can avoid the driver having to again activate the first turn signal within the roundabout based on the automatic turn signal cancellation mistakenly identifying different turns from entry, staying within, and exiting the roundabout as a completion of a turn. If the vehicle turning does not return to the turn neutral position within the first stability time, cancellation of the second turn signal is delayed as this may mean the vehicle has not yet exited the roundabout.

In an exemplary aspect, using a right-side driving country as an example, the automatic turn signal cancellation system can be configured to first detect a left turn signal activation by the driver (e.g., a moving the turn signal stalk to the left turn switch position). If the right turn signal was activated, the automatic turn signal cancellation system can operate to cancel the right turn signal based on detection of completion of a simple right turn without having to detect a roundabout since a simple right turn and roundabout exit are both right turns. However, with the left turn signal activated, this could be an indication that the driver plans to make a normal left turn, or it could be an indication that the driver is entering a roundabout and signaling an indication of exiting the roundabout beyond the first exit. The automatic turn signal cancellation system does not know at this point, and thus the automatic turn signal cancellation system is configured to not prematurely cancel the left turn signal at this time. The automatic turn signal cancellation system is then configured to detect the vehicle turning (e.g., based on a detected steering wheel angle or vehicle wheels angle exceeding a threshold angle, which may be dynamically set based on the speed of the vehicle). If a left turn is detected, this is an indication of a simple left turn, and the automatic turn signal cancellation system can operate as normal to cancel the left turn signal after the left turn is completed. However, if the automatic turn signal cancellation system detects a turn towards the right turn direction in the opposite direction of the initial left turn signal, the automatic turn signal cancellation system then detects if vehicle enters a first turn neutral position (e.g., the steering wheel angle and/or the wheel angle enters a +/−1.0 radian first turn neutral angle window). If the vehicle remains stable after entering the first turn neutral position for a designated stability time, this means the right turn is completed and the left turn signal can be cancelled (e.g., the driver may have made a turn signal mistake, but the turn is completed in any regard). However, if the vehicle does not remain stable in the first turn neutral position after the right turn, indicating a turn towards the left turn direction (e.g., the wheel angle indicates a turn back to the left outside the first turn neutral angle window), this is an indication the vehicle may be in a roundabout.

In this case, if the driver then activates a right turn signal and then turns towards a right turn direction, this means that the vehicle may be exiting the roundabout. The automatic turn signal cancellation system can be configured to detect the vehicle entering a second turn neutral position (e.g., a steering wheel angle or wheels angle enters a +/−0.2 radian angle window) as a way to detect that the vehicle may turning to exit the roundabout. The second turn neutral angle window has a reduce radian width over the first turn neutral angle window in this example, because if the vehicle is truly in a roundabout at this point, the vehicle turn (e.g., a steering wheel angle and/or wheel angle) should be very close or move to a zero, neutral turn neutral position by the vehicle turning back from the roundabout turn direction to the exit turn direction. This prevents or reduces false detections of the vehicle being in a roundabout. The automatic turn signal cancellation system can then, thereafter, detect if the vehicle remains in the first turn neutral position (e.g., the steering wheel angle remains in a turn neutral angle window of +/−1 radian that may be larger than the second turn neutral angle window) for a second stability time (e.g., 1.5 seconds), signifying completion of the right turn after exiting the roundabout. If the automatic turn signal cancellation system detects the vehicle remaining in the first turn neutral position for the second stability time, the automatic turn signal cancellation system can cancel the right turn signal because of detecting completion of the right turn after exiting the roundabout. If however, the automatic turn signal cancellation system detects the vehicle not remaining in the third turn neutral position for the second stability time, cancellation of the right turn signal can be delayed as this may mean the vehicle has not yet exited the roundabout.

The automatic turn signal cancellation system can also be configured for a left-side driving country, for turn signal cancellation based on the above referenced criteria with discussed left turns/angles instead being right turns/angles, and right turns/angles instead being left turns/angles.

In this regard, FIG. 1 is a side perspective view of an exemplary vehicle 100 in the form of a truck that has front head lights 102A, 102B that include respective front left and front right turn signals 104A, 104B configured to be manually activated by a turn signal activator 106 (e.g., a turn signal stalk) to flash to indicate an intention of the driver to turn the vehicle 100. The vehicle 100 also has rear left and right turn signals 108A, 108B located in the rear of the vehicle 100 that are also configured to flash when the turn signal activator 106 is activated. When the turn signal activator 106 is activated for a left turn, the front and rear left turn signals 104A, 108A are activated to flash. When the turn signal activator 106 is activated for a right turn, the front and rear right turn signals 104B, 108B are activated to flash. The vehicle 100 may have other turn signals as well. The vehicle 100 also includes wheels 110 with tires that support the vehicle 100 on the road and are linked to axles that are controlled by a steering wheel (see FIG. 2) inside the vehicle 100 for the driver to turn the vehicle in the desired direction.

Figure 2:
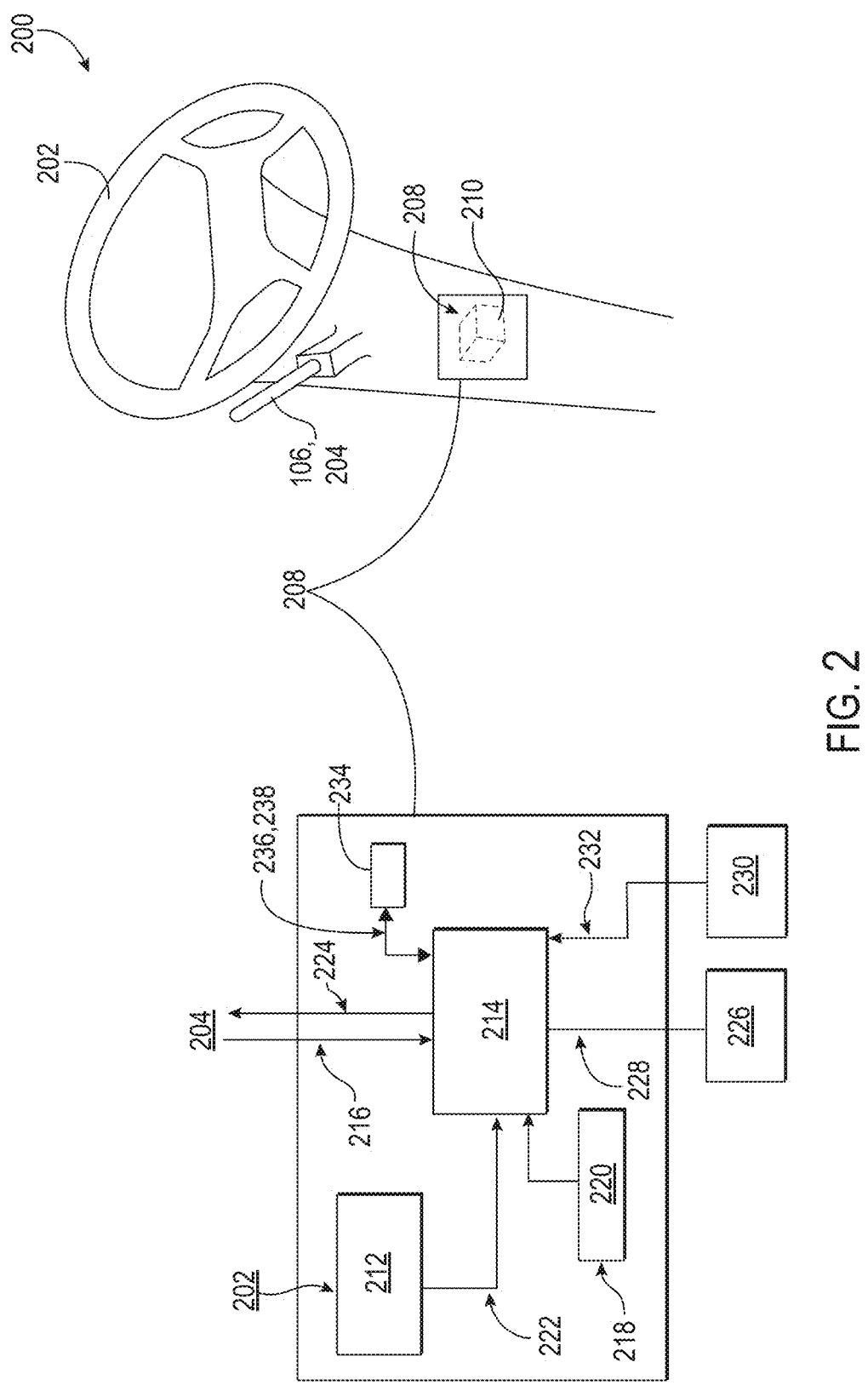
FIG. 2 is a side perspective view of an exemplary steering system that can be in the vehicle in FIG. 1, wherein the steering system includes a steering wheel and a turn signal stalk for activation of a turn signal, and an automatic turn signal cancellation system that is coupled to the steering wheel and includes a steering wheel sensor in the form of a steering wheel angle sensor configured to detect the turn angle of the steering wheel relative to a turn neutral position in response to an initial turn signal in the opposite direction of the entry turn direction into a roundabout, and a further turn signaling pattern with certain vehicle turning that may indicate a roundabout driving pattern and roundabout exit.
Figure 3:
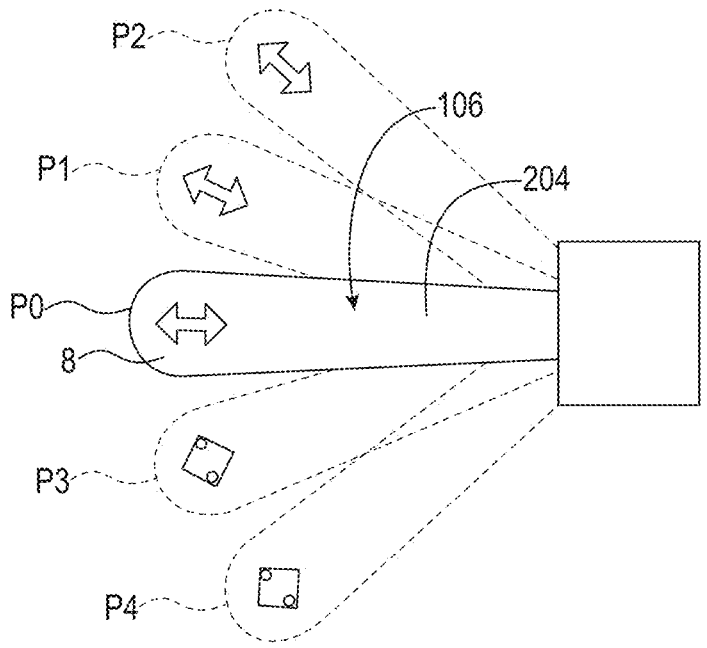
FIG. 3 is a side view of exemplary switch positions of the turn signal stalk in FIG. 2.

FIG. 2 is a side perspective view of an exemplary steering system 200 that can be in the vehicle 100 in FIG. 1 that includes a steering wheel 202 that can be controlled by a driver to steer and turn the vehicle 100. The steering system 200 also includes the turn signal activator 106 in the form of a turn signal stalk 204 in this example for activation of the turn signals 104A, 108A and 104B, 108B. However, other forms of a turn signal activator 106, such as a turn signal button integrated into the steering wheel 202, could also be provided. In this example, as shown in FIG. 3, to activate the left turn signals 104A, 108A, the turn signal stalk 204 is rotated downward from a P0 turn neutral position, which is also a turn signal deactivation position, to position P4. Position P0 of the turn signal stalk 204 is referred to as "stable" or turn neutral position because it is a position in which the turn signal stalk 204 is located by default, in the absence of any action by the driver. On the other hand, all other positions P1 to P4 are referred to as "unstable" positions since the turn signal stalk 204 cannot remain locked (alone) in any of these positions. The driver of the vehicle 100 moves the turn signal stalk 204 up when he wishes to turn right and moves the turn signal stalk 204 down when he wishes to turn left. To activate the right turn signals 104B, 108B, the turn signal stalk 204 is rotated upward to the P2 position. In this example, to momentarily activate either the left turn signals 104A, 108A, or right turn signals 104B, 108B, the turn signal stalk 204 can be moved to the positions P3 and P1, respectively, which are also referred to as "highway positions" to signify lane changes or merging entrances and exits, for example. In positions P3 and P1, the turn signal stalk 204 is configured to automatically return to position P0 when force is removed from the turn signal stalk 204. The steering system 200 in the vehicle 100 may be configured to cause the left turn signals 104A, 108A and right turn signals 104B, 108B to flash for only a predetermined or programmed limited number of times or duration of time when the turn signal stalk 204 is moved to the respective positions P3 and P1. This is particularly suitable for driving on highways, where changes of direction are generally very short. In this instance, turn signal cancellation is not required. Advantageously, if the driver keeps the turn signal stalk 204 in its first position P1 or P3, i.e., if he does not let the turn signal stalk 204 return to its neutral position P0, then the right turn signals 104B, 108B or left turn signals 104A, 108A remain activated until the turn signal stalk 204 returns to its neutral position P0.

The angle of movement required to move the turn signal stalk 204 between the neutral position P0 and the second position P2 or P4 is greater than that required to move the turn signal stalk 204 between the neutral position P0 and the first position P1 or P3. When the turn signal stalk 204 is set to either position P2 or P4 in this example, the turn signal stalk 204 could be designed to release back to neutral position P0 with the respective right turn signals 104B, 108B or left turn signals 104A, 108A remaining active until either cancelled manually by the driver or through an automatic turn signal cancellation system like described below. Alternatively, when the turn signal stalk 204 is set to either position P2 or P4, the turn signal stalk 204 could be designed to remain in these positions and the respective right turn signals 104B, 108B or left turn signals 104A, 108A remain active until the turn signal stalk 204 is moved out of these positions P2 or P4 back to the neutral position P0 either manually or through an automatic turn signal cancellation system like described below. This type of actuation mode is discussed in U.S. Pat. No. 9,041,526 B2, which is incorporated herein by reference in its entirety. Thus, right turn signals 104B, 108B or left turn signals 104A, 108A will remain active and continue to flash until either manually cancelled or automatically cancelled by an automatic turn signal cancellation system. For example, a driver may move the turn signal stalk 204 from position P2 or P4 to neutral position P0, or may move the turn signal stalk 204 from position P2 or P4 all the way to respective positions P4 or P2 to signify a right turn then going directly to a left turn. Finally, the turn signals 104A, 108A or 104B, 108B automatically turn off when the driver of the vehicle 100 switches off its ignition, i.e., turns off the engine.

As discussed above, and as shown in FIG. 2, the steering system 200 of the vehicle 100 in this example also includes an automatic turn signal cancellation system 208 configured to automatically deactivate the vehicle's 100 turn signals 104A, 108A or 104B, 108B based on detecting that a turn is completed. This automatic turn signal cancellation system 208 could be part of the vehicle's 100 Electronic Control Unit (ECU). In this example, as shown in FIG. 2, the automatic turn signal cancellation system 208 includes a steering wheel sensor 210 in the form of a steering wheel angle sensor 212 in this example (also referred to as a steering angle sensor (SAS)) to measure the rotation of the steering wheel 202, and in particular the angle of the steering wheel 202 with respect to a turn neutral position in which the vehicle wheels 110 are generally straight. The steering wheel angle sensor 212 can measure the degree of rotation of the steering wheel 202 in relation to a turn neutral position. Of course, any other sensor or method can be used to determine the degree of rotation of the steering wheel in radians/degrees. Typically, steering wheel angle information can be accessed from the power steering system data of the vehicle 100. The angle of the steering wheel 202 is a relative angle which can therefore be positive or negative depending on the direction of rotation from a turn neutral position. Typically, when talking about the steering wheel 202 angle in relation to a turn neutral position (wheels straight), the steering wheel 202 angle will be positive when turning the steering wheel 202 to the left and negative when turning the steering wheel 202 to the right (polar coordinates). The same applies to the average angle of the vehicle's front wheels 110. When turning left, the angle of rotation of the wheels 110 is considered positive, while when turning right, it will be negative. This automatic turn signal cancellation system 208 is configured to control the activation and deactivation of the turn signals 104A, 108A or 104B, 108B according to the driver's maneuvers on the turn signal stalk 204 and the vehicle's driving conditions, as described in more detail below.

Figure 4:
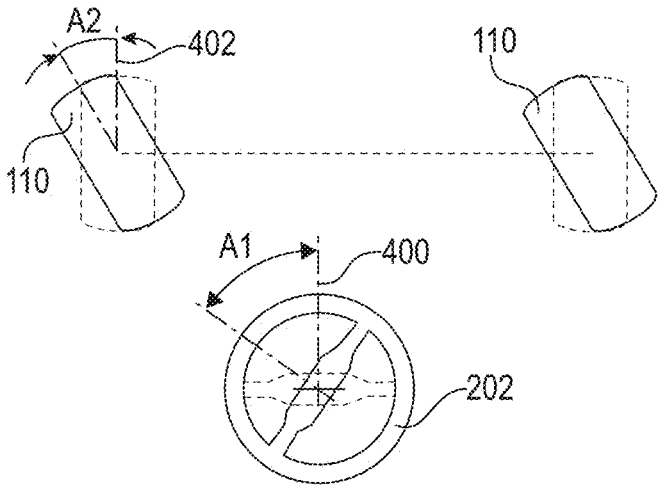
FIG. 4 is a diagram illustrating an exemplary vehicle turn angle as a function of change in the steering wheel angle by the turning of the steering wheel in FIG. 2.

FIG. 4 is a diagram illustrating an exemplary vehicle turn angle that can be sensed by the steering wheel angle sensor 212 as a function of change in the steering wheel 202 angle by the turning of the steering wheel 202 in FIG. 2. For example, as shown in FIG. 4, when the steering wheel 202 is turned from a turn neutral position 400 of the steering wheel 202 to the left at steering wheel angle A1, the vehicle 100 is configured to turn the front wheels 110 from a turn neutral position to a wheel angle A2. In other words, the turning of the steering wheel 202 causes the front wheels 110 to move in the same direction, but such movement may not be linear. The steering wheel angle sensor 212 in FIG. 2 is configured to detect the steering wheel angle A1 movement of the steering wheel 202 from the turn neutral position 400 of the steering wheel 202. The wheel angle A2 is known as average wheel angle, because there may be a slight difference between the right and left wheel 110 angles. The wheel angle A2 of the vehicle's steered wheels' radians with respect to their upright position may be extrapolated based on the steering wheel angle A1 from a model previously established from several wheels angle calculations for several specific steering wheel angles. In particular, the relationship has been advantageously linearized through five (5) wheel steering angle values for which the ratio between steering wheel angle A1 and average wheel angle A2 is known. The parameters that influence the steering of the vehicle 100 and the angle of turning of the wheels 110 as a function of the turning of the steering wheel 202 are essentially as follows: vehicle type (length, weight, etc.), engine (dimensions), chassis, wheelbase, connection bar, front suspension, number of axles, and directional geometry, etc.

Five known exemplary steering ratios are as follows:

Steering ratio when the average wheel angle is 0.6 radians to the right;

Steering ratio when the average wheel angle is 0.2 radians to the right;

Steering ratio when the average wheel angle is 0 radians;

Steering ratio when the average wheel angle is 0.2 radians to the left; and

Steering ratio when the average wheel angle is 0.6 radians to the left.

From these values, it is possible to estimate, for a given steering wheel angle A1 value, the average wheel angle A2 of the corresponding wheels 110 with some precision as described in International Patent Application Publication WO 2020/173543, incorporated herein by reference.

Note that as examples, the automatic turn signal cancellation system 208 can be configured to use the steering wheel angle A1 or a translation of the steering wheel angle A1 to the wheel angle A2 to perform tasks relating to detection and completion of a turn discussed herein.

In this regard, with reference back to FIG. 2 and as discussed in more detail below, the automatic turn signal cancellation system 208 is configured to automatically cancel a turn signal 104A, 108A or 104B, 108B based on determining when a roundabout is truly exited based on detecting an initial turn signal (i.e., a left turn signal 104A, 108A or right turn signal 104B, 108B) in the opposite direction of the entry turn (i.e., right turn or left turn, respectively) direction into the roundabout, and based on determining a further turn signaling pattern with certain vehicle 100 turning that may indicate a roundabout driving pattern and roundabout exit. In this regard, the automatic turn signal cancellation system 208 in FIG. 2 in this example includes a processing circuitry 214 that is configured to receive a turn signal indicator 216 indicating activation of a turn signal 104A, 108A or 104B, 108B. The processing circuitry 214 could be a microprocessor or other central processing unit (CPU) that is configured to execute computer instructions (e.g., software, firmware) to perform tasks. For example, computer instructions 218 could be stored in a memory 220 accessible by the processing circuitry 214 as shown in FIG. 2. The processing circuitry 214 could also be circuitry that does not execute software or computer instructions, but includes logic circuitry that is configured to perform tasks, such as a field programmable gate array (FPGA) or other logic circuitry (e.g., logic gates, flip-flops, and/or data buffer circuits, etc.).

With continuing reference to FIG. 2, the processing circuitry 214 is configured to determine the average wheel angle A2 based on the determined steering wheel angle A1 based on steering wheel angle data 222 from the steering wheel angle sensor 212 like shown in FIG. 4. The steering wheel angle data 222 is data indicative of the steering wheel angle A1 detected by the steering wheel angle sensor 212. The processing circuitry 214 is configured to detect a turn and completion of the turn to automatically cancel a turn signal 104A, 108A or 104B, 108B based on the steering wheel angle data 222. Once the processing circuitry 214 of the automatic turn signal cancellation system 208 determines that a turn has been completed based on the steering wheel angle A1 or wheel angle A2 after a detected turn, the turn is deemed completed, and the processing circuitry 214 cancels the relevant turn signals 104A, 108A or 104B, 108B.

In an alternative, if the turn signal stalk 204 is designed to remain in a turn signal position after moved to position P2 or P4, the processing circuitry 214 could also be configured to issue a release command 224 to automatically return or release the turn signal stalk 204 to neutral position P0 to cancel the turn signals 104A, 108A or 104B, 108B. After the turn is completed, the steering wheel angle A1 and the wheel angle A2 return to approximately zero (0).

Also note that the processing circuitry 214 in the automatic turn signal cancellation system 208 in FIG. 2 can also be configured to interface with a speedometer 226 or other speed measurement device to receive the current speed 228 of the vehicle 100. As discussed in more detail below, the processing circuitry 214 may be configured to use the current speed 228 of the vehicle 100 as part of the automatic turn signal cancellation. Also note that the processing circuitry 214 in the automatic turn signal cancellation system 208 in FIG. 2 can also be configured to interface with a secondary turn data system 230, such as a camera, video camera, radar device, lidar device, a global positioning system (GPS) device, etc., to provide secondary turn data 232 relating to the vehicle 100. For example, the secondary turn data 232 may be forward-looking images from a camera imaged in a direction pointed away from a given side of the vehicle 100. As also discussed in more detail below, the processing circuitry 214 may be configured to use the secondary turn data 232 as part of the automatic turn signal cancellation.

Also, in other exemplary aspects, for the automatic turn signal cancellation system 208 in FIG. 2 to be able to determine if an event occurs withing a determined amount of time, such as a stability time, the automatic turn signal cancellation system 208 can include a timer circuit 234, also referred to as a timer 234. The automatic turn signal cancellation system 208 can be configured to program the timer 234 with a countdown time value 236, which may be stored in the memory 220. The timer 234 can be configured to generate a timer expiration signal 238 in response to the timed countdown of the countdown time value being completed by the timer 234.

Examples of the automatic turn signal cancellation system 208 cancelling a turn signal 104A, 108A or 104B, 108B when a roundabout is truly exited based on detecting an initial turn signal (i.e., a left turn signal 104A, 108A or right turn signal 104B, 108B) in the opposite direction of the entry turn (i.e., right turn or left turn, respectively) direction into the roundabout start at FIG. 6 below. Before discussing these examples, an example of a simple turn in the same direction as an activated turn signal 104A, 108A or 104B, 108B that can be detected by the automatic turn signal cancellation system 208 and such turn signal 104A, 108A or 104B, 108B be automatically cancelled with the turn is detected as completed is first discussed below with regard to FIG. 5.

Figure 5:
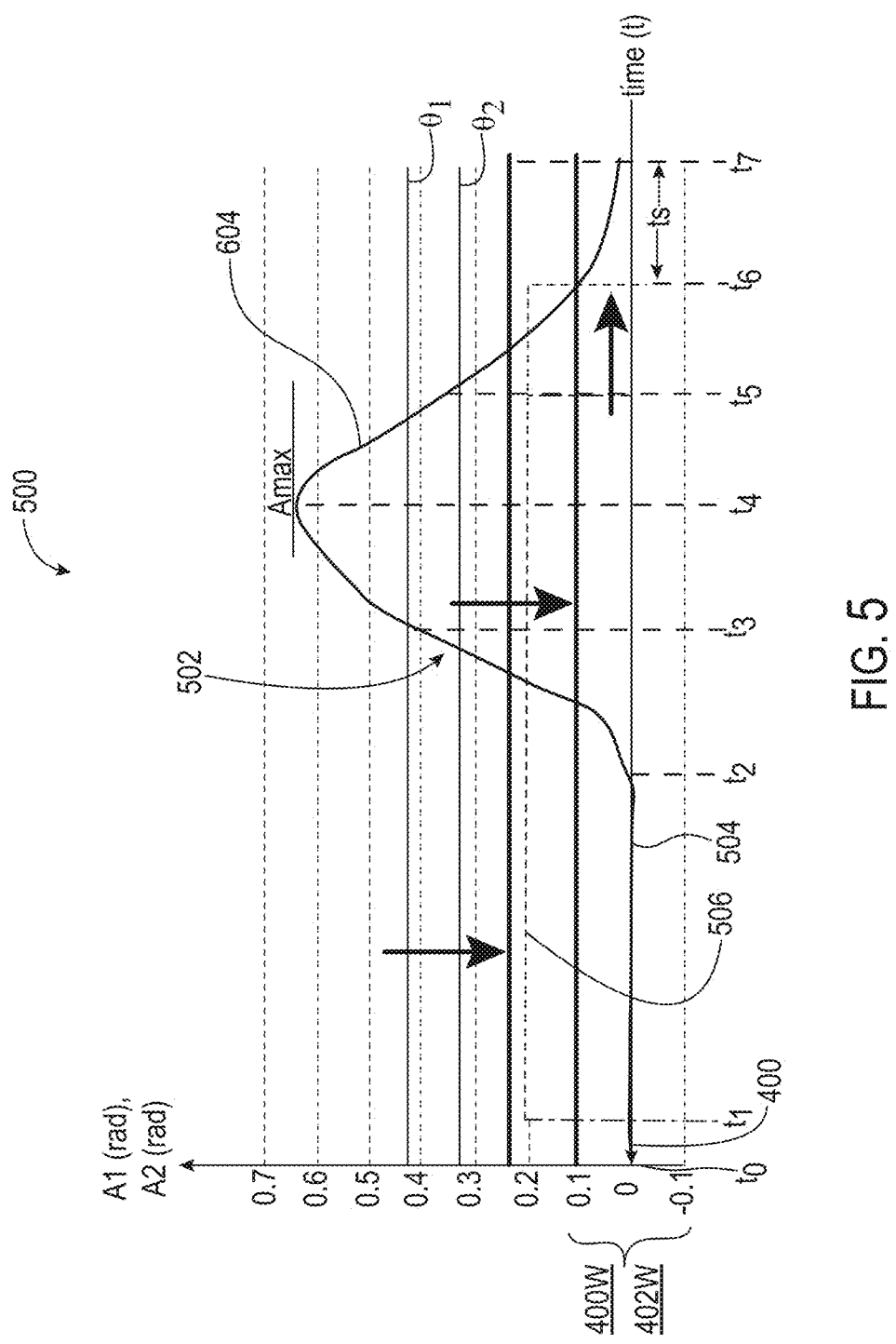
FIG. 5 is a graph illustrating an exemplary steering wheel angle detected by a steering wheel angle sensor in the automatic turn signal cancellation system in FIG. 2, wherein the steering wheel angle is used by the processing circuitry to detect vehicle turning and cancel a turn signal based on the steering wheel angle returning to and remaining in a turn neutral angle window for a stability time.

In this regard, FIG. 5 is a graph 500 illustrating an exemplary turn 502 as a function based on the steering wheel angle A1 or wheel angle A2 as function of time (t). The graph 500 in FIG. 5 is used to discuss an example of the ability of the automatic turn signal cancellation system 208 in FIG. 2 to detect the turn 502 and to automatically cancel a turn signal 104A, 108A or 104B, 108B in response to detecting the turn 502 has been completed. As illustrated in FIG. 5, in this example, at time t0, the steering wheel angle A1 or wheel angle A2 is zero (0) as indicated by steering angle curve 504 meaning that the steering wheel 202 of the vehicle 100 is located at or approximately at a turn neutral position 400 or 402 (see FIG. 4). This means the vehicle wheels 110 are substantially straight and are not turning at this time. Turn signal curve 506, that is, a dashed box in the form of a square wave in this example, illustrates the state of the turn signals 104A, 108A or 104B, 108B being activated, with a zero (0) value meaning the turn signals 104A, 108A or 104B, 108B are not activated, and a step up meaning the turn signals 104A, 108A or 104B, 108B are activated. Then, as shown in FIG. 5, the turn signal activator 106 is activated at time t1 to activate a turn signal 104A, 108A or 104B, 108B. The processing circuitry 214 in the automatic turn signal cancellation system 208 in FIG. 2 can be configured to detect this activation of the turn signal 104A, 108A or 104B, 108B (e.g., based on the turn signal indicator 216 in FIG. 2). In response to the activation of the turn signal activator 106, the processing circuitry 214 is configured to detect the steering wheel angle A1 or wheel angle A2 related to turning of the steering wheel 202 of the vehicle 100 in the same direction of the turn signal 104A, 108A or 104B, 108B. Note that at time t2 in the turn 502 in FIG. 5, the steering wheel angle A1 or wheel angle A2 starts to become positive, meaning that a possible turn is starting by the driver of the vehicle 100 starting to turn the steering wheel 202. In this example in FIG. 5, the turn 502 is a left turn. However, the processing circuitry 214 does not consider the increase in the steering wheel angle A1 or wheel angle A2 to be a turn in this example until the steering wheel angle A1 or wheel angle A2 exceeds a first threshold angle θ1 at time t3. For example, the first threshold angle θ1 may be a fixed angle value or may be dynamically set based on the speed of the vehicle 100 at the time or in response to the first turn signal 104A, 108A or 104B, 108B being detected. In the example turn 502 in FIG. 5, the first threshold angle θ1 is approximately 0.42 radians.

For example, Tables 1A and 1B below illustrate an exemplary correlation of first threshold angle θ1, −θ1 and second threshold angle θ2, −θ2 to speed of the vehicle 100 in kilometers (km) per hour (h) (km/h). These correlations can be used to dynamically used to set the first threshold angle θ1, −θ1 and/or the second threshold angle θ2, −θ2 a function of the speed of the vehicle 100 to determine if a turn is detected by the steering wheel angle A1 or A2 exceeding the dynamically set first threshold angle θ1, −θ1. The steering wheel angle A1 or wheels angle A2 change that occurs for a given turn is inversely related to vehicle speed due to increased centripetal force and inertia of the vehicle 100 turn at higher speeds. Thus, for lower vehicle 100 speeds, the steering wheel angle A1 or wheels angle A2 changes less than at higher vehicle 100 speeds.

TABLE 1A

|  | Speed (228) km/hr | | | | | | |
|  | 0-5 | 5-10 | 10-15 | 15-20 | 20-25 | 25-30 | 30-35 |
| A1 | 4 | 4 | 4 | 4 | 4 | 2.93 | 1 |
| Θ1 | 0.09 | 0.09 | 0.09 | 0.09 | 0.09 | 0.09 | 0.09 |
| Θ2 | 0.75 | 0.75 | 0.75 | 0.75 | 0.75 | 0.75 | 0.75 |

TABLE 1B

|  | Speed (228) km/hr | | | | | | |
|  | 35-40 | 40-45 | 45-50 | 50-55 | 55-60 | 60-65 | 65-90 |
| A1 | 1 | 1 | 1 | 1 | 1 | 1 |  |
| Θ1 | 0.06 | 0.06 | 0.06 | 0.0552 | 0.0552 | 0.0552 | 0.0552 |
| Θ2 | 0.75 | 0.75 | 0.75 | 0.75 | 0.75 | 0.75 | 0.75 |

With continuing reference to FIG. 5, the processing circuitry 214 is then configured to detect the steering wheel angle A1 or wheel angle A2 related to the turning of the steering wheel 202 exceeding the first threshold angle θ1 from a turn neutral position, indicating the turn 502. In this example, the processing circuitry 214 is configured to detect the steering wheel angle A1 or wheel angle A2 exceeding the first threshold angle θ1 from a turn neutral angle window 400W or 402W with an angle range (+1/−1 radian in this example) around the turn neutral position 400 or 402. Thereafter, in response to the processing circuitry 214 detecting the steering wheel angle A1 or wheel angle A2 exceeding the first threshold angle threshold angle θ1, the processing circuitry 214 is configured to detect that the steering wheel angle A1 or wheel angle A2 has fallen below the second threshold angle θ2, less than the first threshold angle θ1, and towards the turn neutral position 400, 402. This is shown at time 15 in FIG. 5. This means that the turn 502 has reached its maximum steering wheel angle $A_{MAX}$, and the steering wheel 202 is starting to be turned back or let recover back towards the turn neutral position 400, 402. The processing circuitry 214 determines the maximum steering wheel angle $A_{MAX}$ of the turn 502 after the steering wheel angle A1 or wheel angle A2 exceeds the first threshold angle θ1, which is shown at time t4 in FIG. 5.

Then, with continuing reference to FIG. 5, after the processing circuitry 214 detects that the steering wheel angle A1 or wheel angle A2 has fallen below the second threshold angle θ2 (less than the first threshold angle θ1) and towards the turn neutral position 400, 402, the steering wheel 202 will return to a stable position (i.e., turn neutral position 400, 402). The processing circuitry 214 then determines whether the steering wheel angle A1 or wheel angle A2 remains in the turn neutral angle window 400W or 402W after entering the turn neutral angle window 400W or 402W (starting at time t6 in this example) for a defined stability time ts. The processing circuitry 214 determines whether the steering wheel angle A1 or wheel angle A2 remains in the turn neutral angle window 400W or 402W for the stability time after the steering wheel angle A1 or wheel angle A2 falls below the second threshold angle θ2. If the processing circuitry 214 determines that the steering wheel angle A1 or wheel angle A2 remains in the turn neutral angle window 400W or 402W during the set stability time ts, this means that the steering wheel 202 and the vehicle wheels 110 are substantially no longer turning for the stability time ts, thus indicating the turn 502 has completed. The automatic turn signal cancellation system 208 can then cancel the turn signal 104A, 108A or 104B, 108B via the processing circuitry 214. In this example turn 502 in FIG. 5, the stability time ts is from time t6 to time t7. As shown in FIG. 5, the steering wheel angle A1 or wheel angle A2 remains in the turn neutral angle window 400W or 402W during the set stability time ts between time t6 and time t7. If the steering wheel angle A1 or wheel angle A2 did not remain in the turn neutral angle window 400W or 402W during the set stability time ts between time t6 and time t7, and instead increased outside the turn neutral angle window 400W or 402W, the turn signal 104A, 108A or 104B, 108B would not be cancelled until the steering wheel angle A1 or wheel angle A2 returned and remained inside the turn neutral angle window 400W or 402W for at least the set stability time ts.

As discussed above, the automatic turn signal cancellation system 208 in FIG. 2 can also be used to cancel a turn signal 104A, 108A or 104B, 108B that has been activated based on detecting an initial turn signal 104A, 108A or 104B, 108B in the opposite direction of a detected entry turn direction using the steering wheel angle sensor 212 in the opposite direction of the entry turn direction into a roundabout. For example, FIG. 6 illustrates an exemplary roundabout 600 for a right-side drive country that is a circular-shaped traffic pattern that includes multiple spokes 602 or entry/exit points 602 to enter and exit the roundabout 600. In this example, there are four spokes 602(1)-602(4) in the roundabout 600 in FIG. 6 all at approximately 90 degrees with respect to each other.

Figure 6:
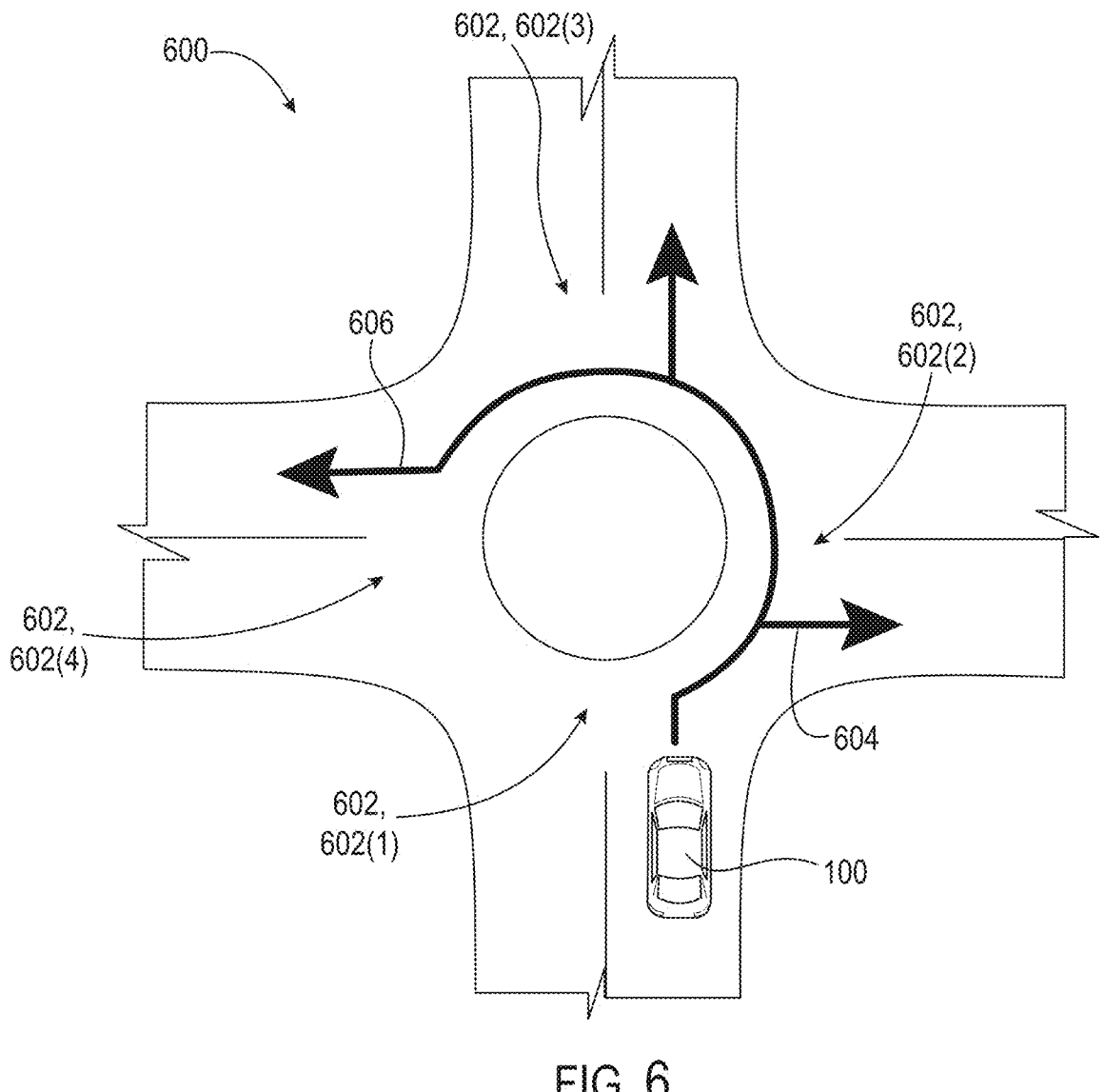
FIG. 6 is an exemplary roundabout.

Roundabouts, like the roundabout 600 in FIG. 6, present special challenges for automatic turn signal cancellation. In the example of the roundabout 600 in FIG. 6 for a right-side driving country, the driver of the vehicle 100 turns right to make a first right turn 604 from the first spoke 602(1) to enter the roundabout 600. After the first right turn 604, the driver of the vehicle 100 then moves the steering wheel 202 to the left to move counter-clockwise to remain in the roundabout 600 until the driver desires to exit the roundabout 600 by making a second right turn 606 onto the fourth spoke 602(4). In the example of a right-side driving country, best or customary practices for turn signaling may be for a driver of the vehicle 100 to activate their right turn signal 104B, 108B when making the first right turn 604 to enter the roundabout 600 if the driver's intention is to take the first exit (i.e., second spoke 602(2)) out of the roundabout 600. In this instance, the driver's path will mimic a normal right-hand turn, because the driver will likely exit the roundabout 600 to the right before the steering wheel 202 returns back to or close to the turn neutral position 400, 402 due to turning the steering wheel 202 towards the left to traverse the roundabout 600 after the first right turn 604 entrance. In this case, the automatic turn signal cancellation system 208 may be configured to more easily and accurately recognize turn completion after exiting the roundabout and cancel the right turn signal only after the roundabout is exited.

However, in this example, when the driver's intention is to not take the first exit on the second spoke 602(2) out of the roundabout 600, best or customary practices in a right-side driving country for turn signaling may be for a driver of the vehicle 100 to activate their left turn signal 104A, 108A and not their right turn signal 104B, 108B when making the first right turn 604 to enter the roundabout 600. The driver of the vehicle 100 may then subsequently activate their right turn signal 104B, 108B when making the second right turn 606 on the fourth spoke 602(4) to signify intention to exit the roundabout 600. The same discussed above may also be best or customary practices in reverse for left-side driving countries. In this example of a right-side driving country and the roundabout 600 in FIG. 6, the automatic turn signal cancellation system 208 may prematurely cancel the left turn signal 104A, 108A since the driver is immediately turning right in the first right turn 604 to enter the roundabout 600. The left turn signal 104A, 108A premature cancellation may confuse other drivers and/or cause the driver to have to reactivate the left turn signal 104A, 108A within the roundabout 600.

In this regard, as discussed by examples below, the automatic turn signal cancellation system 208 in FIG. 2 is also configured to detect activation of a first turn signal 104A, 108A or 104B, 108B by activation of the turn signal stalk 204 to a permanent turn signal position P2 or P4 by a driver of the vehicle 100 in a direction opposite of the turn direction of the vehicle 100. This may signify the vehicle's 100 entry into a roundabout, like the roundabout 600 in FIG. 6 for example. Automatic cancellation of the first turn signal 104A, 108A or 104B, 108B is delayed by the automatic turn signal cancellation system 208 in response to detecting the vehicle 100 remaining within the roundabout (e.g., based on the detected steering wheel angle A1 or wheel angle A2) so that the first turn signal 104A, 108A or 104B, 108B remains active without the driver having to reactivate the first turn signal 104A, 108A or 104B, 108B to signify intention to remain in the roundabout. The automatic turn signal cancellation system 208 is then configured to detect activation of a second turn signal 104B, 108B or 104A, 108A opposite of the direction of the first turn signal 104A, 108A or 104B, 108B that may signify the vehicle 100 exiting the roundabout. The automatic turn signal cancellation system 208 is then configured to detect the vehicle 100 turning (e.g., based on the detected steering wheel angle A1 or wheel angle A2) to approximately a turn neutral position within a stability time to signify exit completion from the roundabout, to then cancel the second turn signal 104B, 108B or 104A, 108A. This can avoid the driver having to again activate the first turn signal 104A, 108A or 104B, 108B within the roundabout based on the automatic turn signal cancellation system 208 mistakenly identifying different turns from entry, staying within, and exiting the roundabout as a completion of a turn. If the automatic turn signal cancellation system 208 does not detect the vehicle returning to a turn neutral position within the stability time, cancellation of the second turn signal 104B, 108B or 104A, 108A is delayed, as this may mean the vehicle 100 has not yet exited the roundabout.

Figure 7:
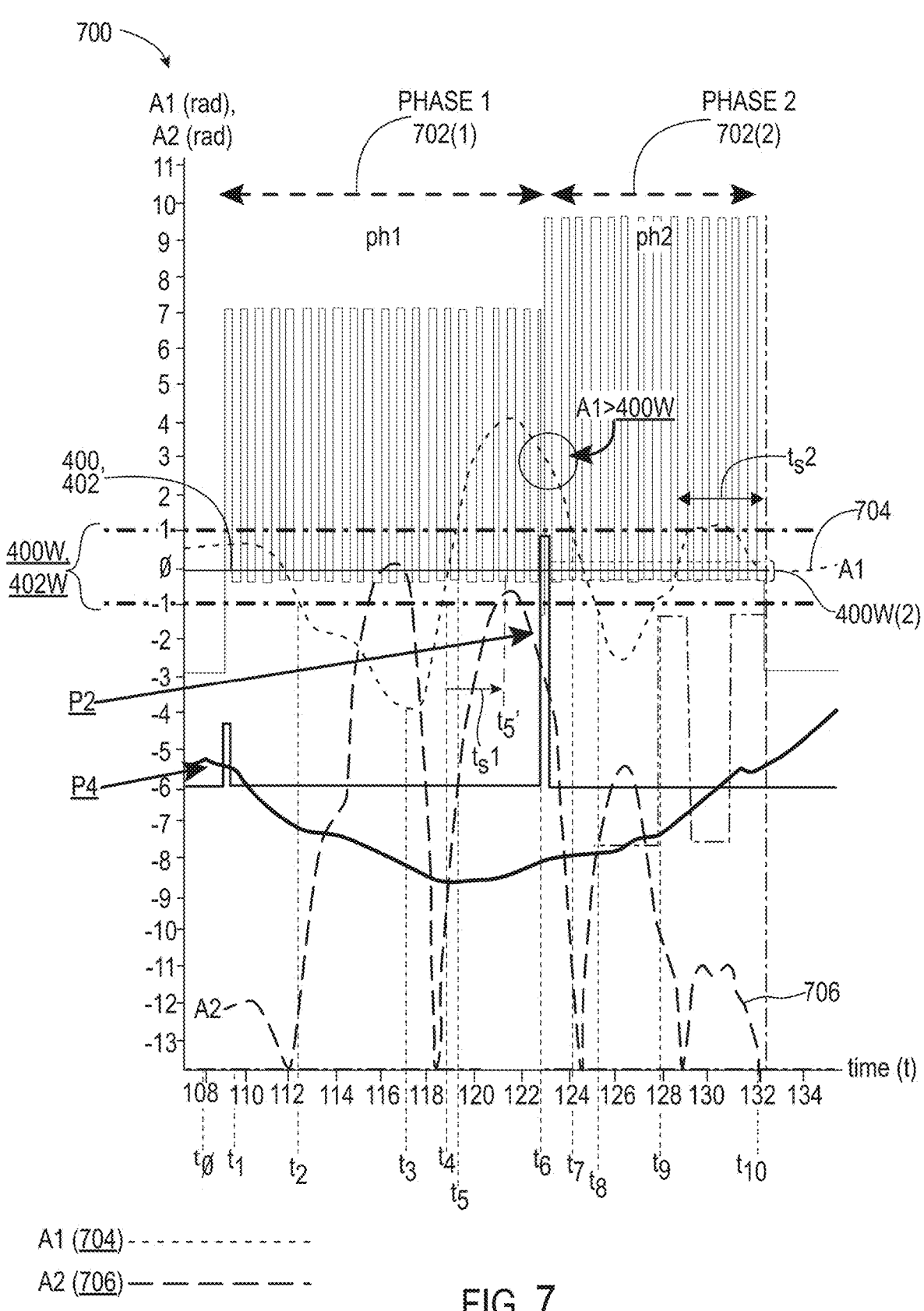
FIG. 7 is a graph illustrating an exemplary steering wheel angle and turn signal pattern as a function of time to illustrate the automatic turn signal cancellation system in FIG. 2 automatically cancelling a turn signal based on detecting when a roundabout is truly exited based on detecting an initial turn signal in the opposite direction of the entry turn direction into the roundabout, and a further turn signaling pattern with certain vehicle turning that may indicate a roundabout driving pattern and roundabout exit.
Figure 8:
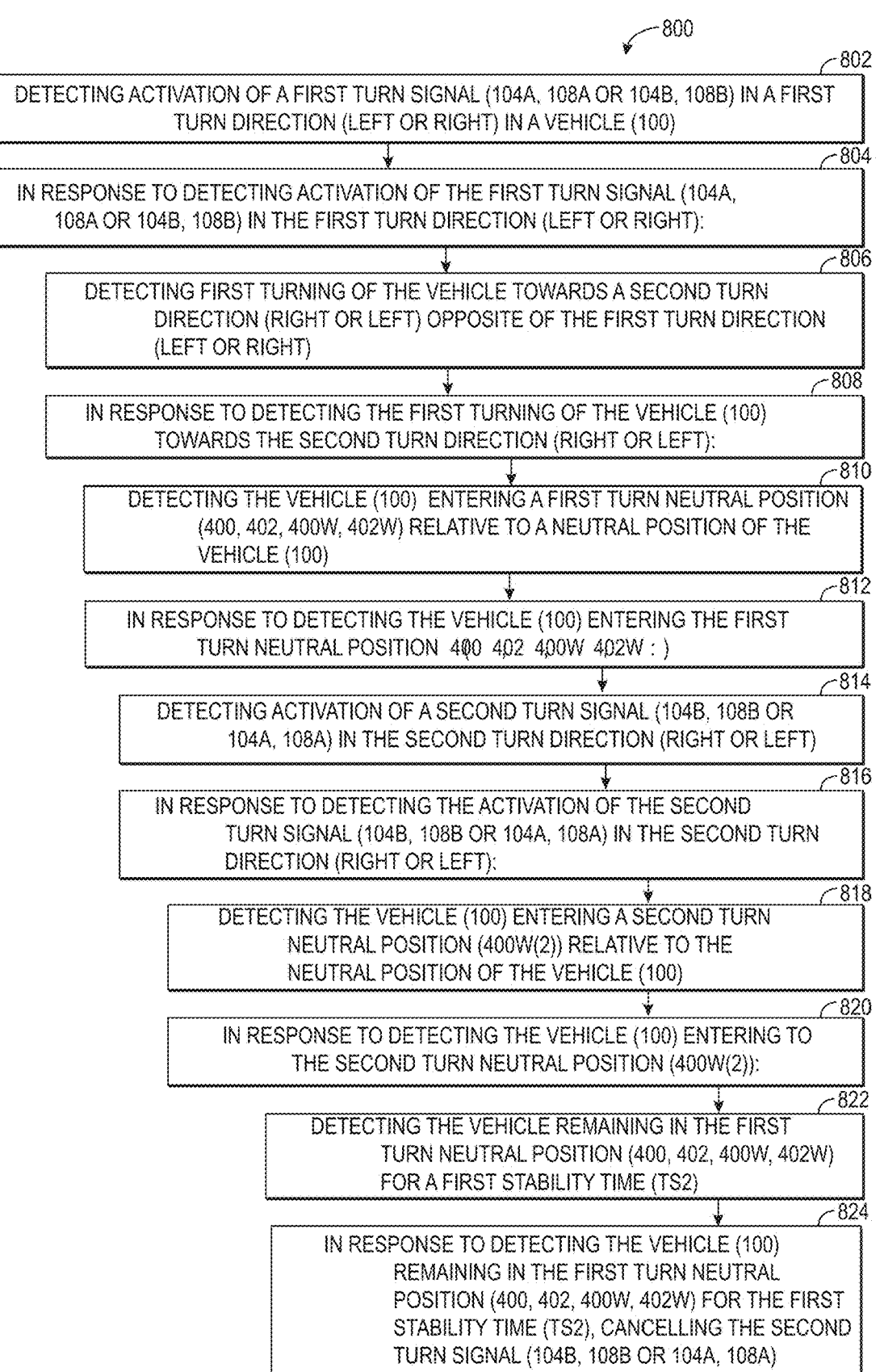
FIG. 8 is a flowchart illustrating an exemplary process of the processing circuitry in the automatic turn signal cancellation system in FIG. 2 automatically cancelling a turn signal based on detecting when a roundabout is truly exited based on detecting an initial turn signal in the opposite direction of the entry turn direction into the roundabout, and a further turn signaling pattern with certain vehicle turning that may indicate a roundabout driving pattern and roundabout exit.

In this regard, FIG. 7 is a graph 700 illustrating exemplary vehicle 100 turning for entering, driving within, and exiting a roundabout, such as the roundabout 600 in FIG. 6, as a function of the steering wheel angle A1 or wheel angle A2 and time (t). The graph 700 in FIG. 7 is used to discuss the ability of the automatic turn signal cancellation system 208 in FIG. 2 to detect a vehicle's 100 turn in the opposite direction of a turn signal 104A, 108A or 104B, 108B and to detect subsequent turning patterns of the vehicle to signify entry into and exit out of a roundabout for automatic turn signal cancellation. FIG. 8 is a flowchart illustrating an exemplary process 800 of the processing circuitry 214 in the automatic turn signal cancellation system 208 in FIG. 2 automatically cancelling a turn signal 104A, 108A or 104B, 108B based on detecting a vehicle's 100 turn in the opposite direction of a turn signal 104A, 108A or 104B, 108B and detecting subsequent turning patterns of the vehicle to signify entry into and exit out of a roundabout for automatic turn signal cancellation. The exemplary process 800 in FIG. 8 is discussed below with reference to the exemplary vehicle 100 turning in the graph 700 in FIG. 7, but such is not limiting.

In this regard, as illustrated in FIG. 7, at time to in a first phase 702(1), the steering wheel angle A1 of the steering wheel 202 is within a turn neutral angle window 400W (see also, FIG. 4) as indicated by steering angle curve 704. In this example, the turn neutral angle window is an angle range of +1/−1 radian around the turn neutral position 400. The processing circuitry 214 is configured to detect activation of a first turn signal 104A, 108A or 104B, 108B in a first turn direction (shown at time t1), which in this example is a first, left turn signal 104A, 108A in a first, left turn direction based on detecting position P4 of the turn signal stalk 204 from the turn signal indicator 216 in FIG. 2 (block 802 in FIG. 8). In this example, the vehicle 100 is in a right-side driving country. In response to detection of the activation of the first, left turn signal 104A, 108A (block 804 in FIG. 8), the processing circuitry 214 is configured to detect the first turning of the vehicle 100 towards a second turn direction, which in this example is a right turn direction in the opposite direction of the first, left turn direction (block 806 in FIG. 8).

This means the vehicle 100 may be entering a roundabout with the driver signifying an intention of not taking the first exit or spoke out of the roundabout by activation of the left turn signal 104A, 108A in the opposite direction of the right turn direction. The processing circuitry 214 may be configured to detect the first turning of the vehicle 100 towards a second, right turn direction. In the graph 700 in FIG. 7, the steering wheel angle A1 moving downward indicating the steering wheel 202 being rotated in a right, clockwise direction. The steering wheel angle A1 moves downward, outside the turn neutral angle window 400W a first time at time t2. The processing circuitry 214 may be configured to detect the first turning of the vehicle 100 towards a second, right turn direction by being configured to determine if the wheel angle A2 of the vehicle 100, as indicated by wheels angle curve 706, exceeds a designated or determined threshold angle, like the first threshold angle θ1, −θ1 discussed above for FIG. 5. As previously discussed above, the wheels angle A2 of the vehicle 100 can be determined and approximated from the steering wheel angle A1 that can be determined from the steering wheel angle sensor 212.

The wheels angle A2 can be dynamically determined based on the current speed 226 of the vehicle as previously discussed with regard to FIG. 5 as an example. However, for a larger diameter roundabout, for the first exit, the wheels angle A2 may not exceed the first threshold angle θ1, −θ1. However, if the vehicle 100 accelerates through the exiting of the roundabout, the wheels angle A2 can be detected as exceeding the first threshold angle θ1, −θ1, and the first, left turn signal 104A, 108A turn signal can be automatically cancelled after vehicle is detected as remaining stable for a designated stability time. However, if there is not acceleration into the roundabout exit (such as due to a traffic jam), the processing circuitry 214 may not be able to detect the wheels angle A2 exceeding the first threshold angle θ1, −θ1, and thus the left turn signal 104A, 108A will not be automatically cancelled. Thus, the value of first threshold angle θ1, −θ1 could be set to be higher value at lower vehicle 100 speeds, to avoid detecting the wheels angle A2 as exceeding the first threshold angle θ1, −θ1 to avoid an untimely cancellation of the first, left turn signal 104A, 108A in the roundabout.

For example, Tables 1A and 1B below illustrate an exemplary correlation of first threshold angle θ1, −θ1 and second threshold angle θ2, −θ2 to speed of the vehicle 100 in kilometers (km) per hour (h) (km/h). These correlations can be used to dynamically used to set the first threshold angle θ1, −θ1 and/or the second threshold angle θ2, −θ2 a function of the speed of the vehicle 100 to determine if a turn is detected by the steering wheel angle A1 or A2 exceeding the dynamically set first threshold angle θ1, −θ1. The steering wheel angle A1 or wheels angle A2 change that occurs for a given turn is inversely related to vehicle speed due to increased centripetal force and inertia of the vehicle 100 turn at higher speeds. Thus, for lower vehicle 100 speeds, the steering wheel angle A1 or wheels angle A2 changes less than at higher vehicle 100 speeds.

TABLE 1A

| | Speed (228) km/hr | | | | | | |
|---|---|---|---|---|---|---|---|
| | 0-5 | 5-10 | 10-15 | 15-20 | 20-25 | 25-30 | 30-35 |
| A1 | 4 | 4 | 4 | 4 | 4 | 2.93 | 1 |
| Θ1 | 0.09 | 0.09 | 0.09 | 0.09 | 0.09 | 0.09 | 0.09 |
| Θ2 | 0.75 | 0.75 | 0.75 | 0.75 | 0.75 | 0.75 | 0.75 |

TABLE 1B

| | Speed (228) km/hr | | | | | | |
|---|---|---|---|---|---|---|---|
| | 35-40 | 40-45 | 45-50 | 50-55 | 55-60 | 60-65 | 65-90 |
| A1 | 1 | 1 | 1 | 1 | 1 | 1 | |
| $\Theta 1$ | 0.06 | 0.06 | 0.06 | 0.0552 | 0.0552 | 0.0552 | 0.0552 |
| $\Theta 2$ | 0.75 | 0.75 | 0.75 | 0.75 | 0.75 | 0.75 | 0.75 |

If instead of the processing circuitry 214 detect the first turning of the vehicle 100 towards the second, right turn direction opposite of the first, left turn signal 104A, 108A, the processing circuitry 214 were to detect the wheel angles A1 moving in the same direction as the direction of the first, left turn signal 104A, 108A, this may be a simple turn. The processing circuitry 214 could be configured to cancel the first turn signal 104A, 108A after the wheel angle A2 moved back within the turn neutral angle window 400W for a designated first stability time ts1 (e.g., 1.5 seconds), indicative of the turn being completed.

However, with the processing circuitry 214 detecting the turning of the steering wheel 202 of the vehicle 100 towards a second turn direction and in turn the wheel angle A2 toward the second turn direction, which in this example is a right turn direction in the opposite direction of the first, left turn direction (block 806 in FIG. 8), this may not be a simple turn. The processing circuitry 214 is configured to not prematurely cancel the first, left turn signal 104A, 108A prematurely so that the driver's intention remain visually active to avoid confusion among other drivers entering, driving within, and/or exiting the roundabout.

With reference back to FIG. 7, the processing circuitry 214 detects the steering wheel angle A1 and/or wheels angle A2 starting to move upward back toward the respective turn neutral angle window 400W, 402W at time t3, signifying the turning of the steering wheel 202 back to the left (block 806 in FIG. 8). This may be the driver turning the steering wheel 202 back to the left after the first turn that is detected by the processing circuitry 214 above, to stay within a roundabout, in this example. In response to the processing circuitry 214 detecting the steering wheel angle A1 and/or wheels angle A2 starting to move upward back toward the respective turn neutral angle window 400W, 402W (block 808 in FIG. 3), the processing circuitry 214 is configured to detect the vehicle 100 entering a turn neutral position 400, 402 (e.g., a turn neutral angle window 400W, 402W) (block 810 in FIG. 8). The steering wheel angle A1 and wheels angle A2 can eventually move back within the respective turn neutral angle window 400W, 402W at time t4 in this example, as shown in FIG. 7, if the vehicle 100 starts to turn back in the turn direction of the left turn signal 104A, 108A, such as would be the case if the vehicle 100 is remaining in the roundabout.

The processing circuitry 214 can be configured to cancel the first, left turn signal 104A, 108A after the steering wheel angle A1 and/or wheel angle A2 moves back and remains within the respective turn neutral angle window 400W, 402W for a designated first stability time ts1 (e.g., 1.5 seconds) indicative of the left turn being completed, which would be the case either for a simple turn to the left or a simple turn to the right to exit the roundabout at a first spoke, for example. For example, the processing circuitry 214 can use the timer 234 (see FIG. 2) to determine if the steering wheel angle A1 and/or wheel angle A2 remains in the respective turn neutral angle window 400W, 402W for a determined stability time. For example, the driver of the vehicle may have intended to take the first spoke to the right as a right turn exit from a roundabout, but turned on the left turn signal 104A, 108A by mistake. In either case, the processing circuitry 214 can be configured to cancel the first, left turn signal 104A, 108A if such a simple turn is detected. With this criteria of the processing circuitry 214 detecting the steering wheel angle A1 and/or wheel angle A2 moving in the same direction as the direction of the first, left turn signal 104A, 108A to in turn cancel the first turn signal 104A, 108A detected as a simple left turn at this point in the process, the first threshold angle $\theta 1$, $-\theta 1$ discussed above as being used to detect the first turning of the vehicle 100 towards a second, right turn direction in block 806 in FIG. 8 can be set or determined another way to be less dynamic based on vehicle 100 speed. For example, Tables 2A and 2B below illustrate another exemplary correlation of first threshold angle $\theta 1$, $-\theta 1$ and second threshold angle $\theta 2$, $-\theta 2$ to speed of the vehicle 100 in kilometers (km) per hour (h) (km/h). These correlations can be used to set the first threshold angle $\theta 1$, $-\theta 1$ and/or the second threshold angle $\theta 2$, $-\theta 2$ a function of the speed of the vehicle 100 to determine if a turn is detected by the steering wheel angle A1 or A2 exceeding the dynamically set first threshold angle $\theta 1$, $-\theta 1$.

TABLE 2A

| | Speed (228) km/hr | | | | | | |
|---|---|---|---|---|---|---|---|
| | 0-5 | 5-10 | 10-15 | 15-20 | 20-25 | 25-30 | 30-35 |
| A1 | 4 | 4 | 4 | 4 | 4 | 2.93 | 1 |
| $\Theta 1$ | 0.0554 | 0.0554 | 0.0554 | 0.0554 | 0.0554 | 0.0554 | 0.0554 |
| $\Theta 2$ | 0.8 | 0.8 | 0.8 | 0.8 | 0.8 | 0.8 | 0.8 |

TABLE 2B

| | Speed (228) km/hr | | | | | | |
|---|---|---|---|---|---|---|---|
| | 35-40 | 40-45 | 45-50 | 50-55 | 55-60 | 60-65 | 65-90 |
| A1 | 1 | 1 | 1 | 1 | 1 | 1 | |
| $\Theta 1$ | 0.0553 | 0.0553 | 0.0553 | 0.0552 | 0.0552 | 0.0552 | 0.0552 |
| $\Theta 2$ | 0.8 | 0.8 | 0.8 | 0.75 | 0.75 | 0.75 | 0.75 |

As shown in Tables 2A and 2B, the first threshold angle $\theta 1$, $-\theta 1$ is almost the same and fairly consistent across all vehicle 100 speeds. Because of the ability of the processing circuitry 214 to determine to cancel the first, left turn signal 104A, 108A after the steering wheel angle A1 and/or wheel angle A2 moves back and remains within the respective turn neutral angle window 400W, 402W the second time for a designated first stability time ts1 (e.g., 1.5 seconds), the first threshold angle $\theta 1$, $-\theta 1$ can be set relatively independent of vehicle 100 speed in this example. Even if there were a traffic jam for example in the roundabout, because the steering wheel angle A1 and/or wheel angle A2 will be detected as outside the stability range of the respective turn neutral angle window 400W, 402W using the lower value first threshold angle $\theta 1$, $-\theta 1$ in Tables 2A and 2B as an example, the first, left turn signal 104A, 108A will not be prematurely cancelled by the processing circuitry 214 when the roundabout is not truly exited until the steering wheel angle A1 and/or wheel angle A2 is fairly close to the respective turn neutral position 400, 402.

With reference back to FIG. 7, since the processing circuitry 214 detects the steering wheel angle A1 and/or the wheel angle A2 moving back outside of the respective turn neutral angle window 400W, 402W a second time at time t5 before the first stability time expires (e.g., between time between t4 and t5'), this means the processing circuitry 214 detects that the first turn is not completed as the steering wheel 202 and wheels 110 are not stable. At time t5, the graph 700 in FIG. 7 shows that the steering wheel angle A1 and/or the wheel angle A2 moving upward outside the respective turn neutral angle window 400W, 402W for a second time, signifying the steering wheel 202 being turned in a second, left turn direction opposite of the first, right turn direction past stability. This could occur if the vehicle 100 was being turned left to remain in a roundabout after a right turn entry into the roundabout. In this instance, it is known to the processing circuitry 214 of the automatic turn signal cancellation system 208 that the vehicle 100 is not making a simple turn, and thus the first, left turn signal 104A, 108A should not be prematurely cancelled.

With continuing reference to FIG. 7, the steering wheel angle A1 and/or the wheel angle A2 moves upward outside the respective turn neutral angle window 400W, 402W at time t5, signifying the turning of the steering wheel 202 in a second, left turn direction opposite of the first, right turn direction before achieving stability of the steering wheel 202. This may be the driver turning the steering wheel 202 back to the left after the first turn that is detected by the processing circuitry 214, to stay within a roundabout, in this example. In response to the processing circuitry 214 detecting the steering wheel angle A1 and/or wheel angle A2 moving in the second, left turn direction opposite of the first, right turn direction outside of the respective turn neutral angle window 400W, 402W for the second time (e.g., at time t5) before the first stability time ts1 expires (block 812 in FIG. 8), The processing circuitry 214 is then configured to detect activation of a second, right turn signal 104B, 108B (block 814 in FIG. 8). The processing circuitry 214 can be configured to detect activation of a second, right turn signal 104B, 108B from position P2 from the turn signal indicator 216 from the activation of the turn signal stalk 204 in the second, right turn direction opposite of the first, left turn direction and opposite of the direction of the first, left turn signal 104A, 108A. This is shown by the activation of the second right turn signal 104B, 108B (e.g., from position P2 from the turn signal indicator 216) at time t6 in FIG. 7. The driver's activation of the second, right turn signal 104B, 108B signifies the driver's intention for the vehicle 100 to make a second, right turn exit from the roundabout. This means that the processing circuitry 214 needs to determine when the second, right turn signal 104B, 108B is to be cancelled, because the driver's activation of the second, right turn signal 104B, 108B has manually cancelled the first, left turn signal 104A, 108A.

In response to detection of the second, right turn signal 104B, 108B (block 816 in FIG. 8) (block 816 in FIG. 8), the processing circuitry 214 detects whether the steering wheel angle A1 has entered a second, turn neutral angle window 400W(2), which is shown at time t7 in in FIG. 7 (block 818 in FIG. 8), either crossing or moving proximate to the turn neutral position 400, 402 a third time. In this example, the second turn neutral angle window 400W(2) is +/–0.2 radians. The second turn neutral angle window 400W(2) has a reduce radian width over the first turn neutral angle window 400, 402 in this example, because if the vehicle 100 is truly in a roundabout at this point, the vehicle 100 turn (e.g., a steering wheel angle A1 and/or wheel angle A2) should be very close or move to a zero, neutral turn neutral position by the vehicle 100 turning back from the roundabout turn direction (left turn direction in this example) to the exit turn direction (right turn direction in this example). This prevents or reduces false detections of the vehicle being in a roundabout. The steering wheel angle A1 returns back to and crosses into the second turn neutral angle window 400W(2) in order to be detected as stable after exiting a roundabout by the processing circuitry 214 before the second, right turn signal 104B, 108B can be automatically cancelled. In this example, in response to the processing circuitry 214 detecting the steering wheel angle A1 has entered a second, turn neutral angle window 400W(2) (block 820 in FIG. 8). The processing circuitry 214 is then configured to detect whether the steering wheel angle A1 and/or the wheels angle A2 remains stable for a designated second stability time (e.g., 1.5 seconds) within the respective turn neutral angle window 400W, 402W (block 822 in FIG. 8), which is shown between time t7 and 18 in FIG. 7 in this example. As shown in FIG. 7, the processing circuitry 214 does not detect the steering wheel angle A1 becoming stable in the turn neutral angle window 400W after entering back into the second turn neutral angle window 400W(2) the second time at time t7, because the steering wheel angle A1 moves outside the turn neutral angle window 400W a third time in less than the stability time as shown between time t7 and time 18 in this example. Thus, the processing circuitry 214 does not yet cancel the second, right turn signal 104B, 108B at this time in this example. In this example, the steering wheel angle A1 eventually returns to the turn neutral angle window 400W at time 19 and remains in the turn neutral angle window 400W for the second stability time ts2 (e.g., 1.5 seconds) at time t10 in this example. The processing circuitry 214 can use the timer 234 to determine if the steering wheel angle A1 remains in the turn neutral angle window 400W for a determined stability time ts2. In response to the processing circuitry 214 determining that the steering wheel angle A1 returns to the turn neutral angle window 400W and remains in the turn neutral angle window 400W for the stability time, the processing circuitry 214 can determine the exit from the roundabout is completed and automatically cancel the second, right turn signals 104B, 108B (block 824 in FIG. 8).

In an example, as shown in FIG. 7, the turn neutral angle window 400W, 402W can be +/–1 radian, but could also be a different window size around the turn neutral position 400, 402. Also, in an example, as shown in FIG. 7, the second turn neutral angle window 400W(2) can be +/–0.2 radians, but could also be a different window size around the turn neutral position 400. The size of the turn neutral angle windows 400W, 400W(2), 402 can be determined based on empirical testing or other data so as to not be too narrow of an angle window for accurately and consistently detecting a turn completion that had actually been completed, but not too wide to prematurely detect a turn completion that was not yet completed.

Also note that the above example, with regard to FIG. 7, is for a roundabout for a right-side driving country. The same process 800 in FIG. 8 could also be performed for a left-side driving country, wherein the left and right designations discussed above would simply be reversed.

Also, in some right-side driving countries, it may be best or customary practices for the driver of the vehicle 100 to activate a right turn signal 104B, 108B to indicate the driver's intent to take either the first or the second exit out of a roundabout, and not just the first exit out of the roundabout. Or, the vehicle driver may have even forgot to activate any turn signal at all when entering a roundabout. In either instance, a turn signal 104A, 108A or 104B, 108B that is opposite of the vehicle turn direction when entering the roundabout does not occur and thus cannot be detected as a way to detect a roundabout for turn signal cancellation as previously discussed above. However, because the exit that will be taken out of the roundabout may not require the initial right turn to enter the roundabout to continue soon after entering the roundabout (e.g., a second or later exit is taken, or the roundabout pattern is such that the first exit requires the driver to steer back to the left for a designated period of time), the steering wheel angle A1 or wheels angle A2 may not indicate the completion of a simple right turn that can be detected for cancelling a right turn signal 104B, 108B if previously activated. This is because the change in A1 or wheels angle A2 may indicate a steering back to the left to remain in the roundabout that is too small to be detected as a simple right turn to then automatically cancel a right turn signal 104B, 108B.

Thus, in other exemplary aspects, the automatic turn signal cancellation system 208 and/or its processing circuitry 214 can be configured to automatically cancel a turn signal 104A, 108A or 104B, 108B that is activated sometime between entering the roundabout and exiting the roundabout and that is in the same direction as the entry turn direction into the roundabout. This is shown in the exemplary process 900 in FIG. 9, which will now be described. In this example, as previously discussed above, the automatic turn signal cancellation system 208 and/or its processing circuitry 214 can be configured to monitor the vehicle's 100 turn direction (e.g., the steering wheel angle A1 using a steering wheel angle sensor 212 or wheels angle A2) to detect a turn where a turn signal 104A, 108A or 104B, 108B (e.g., a right turn signal 104B, 108B) in the opposite direction (left turn direction) has not been activated (i.e., either the turn signal 104A, 108A or 104B, 108B is not activated or the turn signal 104A, 108A or 104B, 108B in the processing circuitry 214 is in the same direction as the turn that was activated). The process 900 will be described with respect to a vehicle 100 and automatic turn signal cancellation system 208 and/or its processing circuitry 214 configured for a right-side driving country, but the same process 900 can also be performed for a vehicle 100 and automatic turn signal cancellation system 208 and/or its processing circuitry 214 configured for a left-side driving country with the left and right designations reversed.

Figure 9:
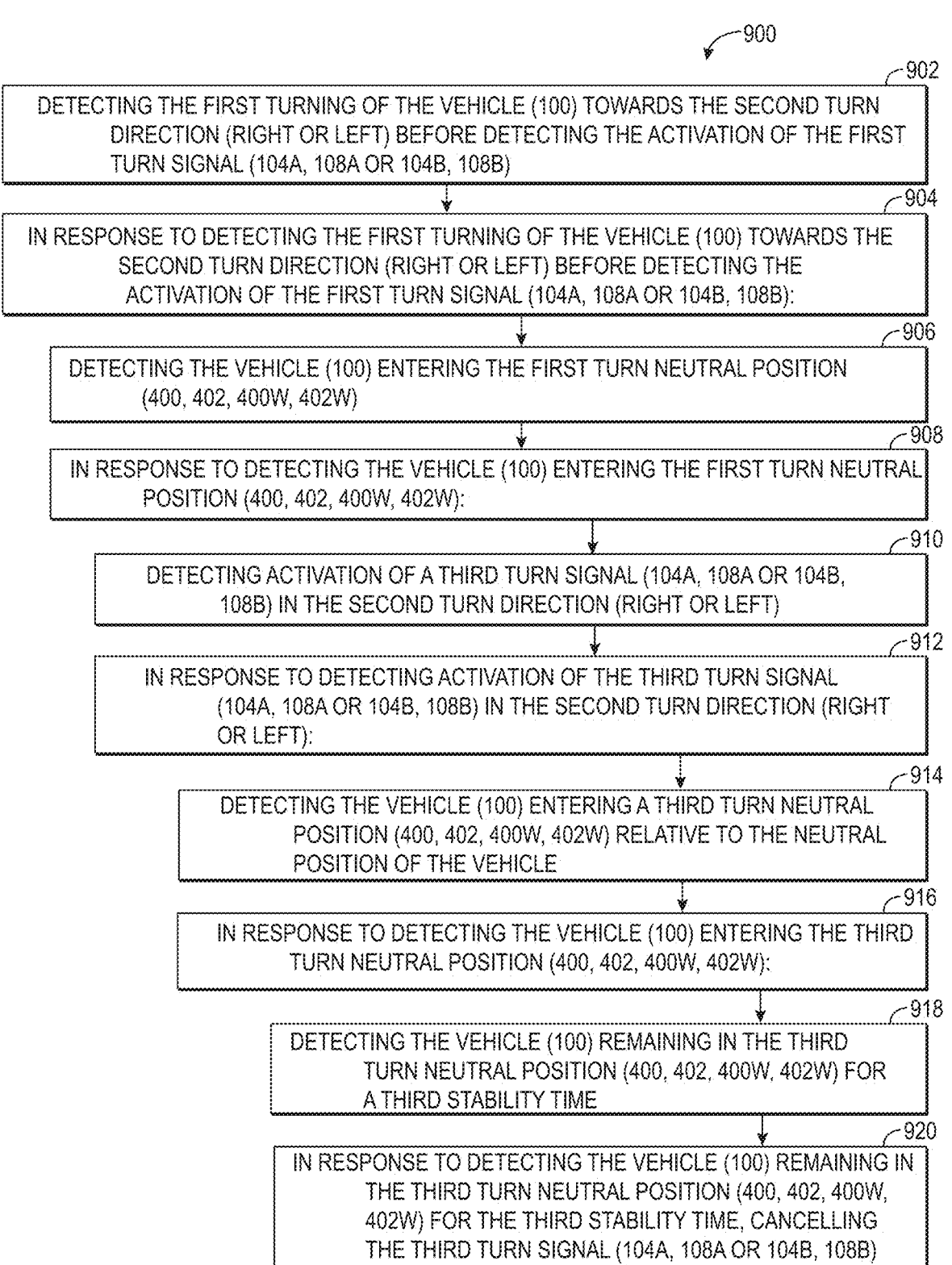
FIG. 9 is a flowchart illustrating an exemplary process of the processing circuitry in the automatic turn signal cancellation system in FIG. 2 automatically cancelling a turn signal that was activated after entering a roundabout and the vehicle is detected to continue to remain within the roundabout.

In this regard, with reference to FIG. 9, the processing circuitry 214 of the automatic turn signal cancellation system 208 and/or its processing circuitry 214 is configured to detect turning of the vehicle 110 and/or steering wheel 202 (e.g., using the steering wheel angle A1 and/or wheels angle A2) towards the second, right turn direction (e.g., as previously described above), before detecting activation of the first, left turn signal 104A, 108A that was used to perform the process 800 in FIG. 8 to detect possible entry into a roundabout (block 902 in FIG. 9). For example, the processing circuitry 214 can be configured to detecting turning of the vehicle 110 and/or steering wheel 202 by detecting the steering wheel angle A1 and/or wheels angle A2 exceeding the first threshold angle towards the right turn direction, as previously discussed above in block 806 in FIG. 8. In response to detecting turning of the vehicle 110 and/or steering wheel 202 (e.g., using the steering wheel angle A1 and/or wheels angle A2) towards the second, right turn direction, before detecting activation of the first, left turn signal 104A, 108A (block 904 in FIG. 9), the processing circuitry 214 is then configured to detect the vehicle 100 entering the first turn neutral position 400, 402 (e.g., in the turn neutral angle window 400W, 402W)) (block 906 in FIG. 9). This can be performed like previously described in block 810 in FIG. 8.

Then, in response to the processing circuitry 214 detecting the vehicle 100 entering the first turn neutral position 400, 402 (e.g., in the turn neutral angle window 400W, 402W)) (block 908 in FIG. 9), the processing circuitry 214 is configured to detect activation of a right turn signal 104B, 108B in the previous vehicle 100 right turn direction that was the entry direction into the roundabout (block 910 in FIG. 9). In response to detecting activation of the right turn signal 104B, 108B in the previous vehicle 100 right turn direction (block 912 in FIG. 9), the processing circuitry 214 then detects if the vehicle 100 (e.g., using the steering wheel angle A1 and/or wheels angle A2) enters into the neutral angle window 400W, 402W (block 914 in FIG. 9). In response to detecting the vehicle 100 turn direction (e.g., using the steering wheel angle A1 and/or wheels angle A2) entering into the neutral angle window 400W, 402W (block 916 in FIG. 9), the processing circuitry 214 can then detect if the vehicle 100 (e.g., using the steering wheel angle A1 and/or wheels angle A2) remains within the turn neutral angle window 400W, 402W for a third stability time (e.g., 4 seconds) (block 918 in FIG. 9). In this example, a longer stability time is provided to give more time for the vehicle 100 turning to become stable in case the driver does not intend to take the immediate next exit, but a later exit from the roundabout. For example, the processing circuitry 214 can be configured to start the timer 234 (FIG. 2) with the third stability time as a countdown time value 236, and determine when the vehicle 100 (e.g., using the steering wheel angle A1 and/or wheels angle A2) turn direction remains within the turn neutral angle window 400W, 402W before the timer 234 issues a timer expiration signal 238 indicating to the processing circuitry 214 that the countdown timer 234 has expired. If not, this means the vehicle 100 did not continue with the same right turn direction to exit the roundabout as was used to enter the roundabout, and instead remains in the roundabout. In this instance, the right turn signal 104B, 108B in the same right turn direction as the entry into the roundabout may have been activated by the driver prior to entering the roundabout. The right turn signal 104B, 108B is not cancelled until either a simple turn in the same right turn direction or subsequent roundabout exit in the same right turn direction as the roundabout entry turn direction is detected as completed. In response to the processing circuitry 214 detecting the vehicle 100 turning (e.g., using the steering wheel angle A1 and/or wheels angle A2) remains in the turn neutral angle window 400W, 402W for at least the third stability time, the processing circuitry 214 cancels the right turn signal 104B, 108B that was detected in block 910 in FIG. 9 (block 920 in FIG. 9).

Figures 10A, 10B:
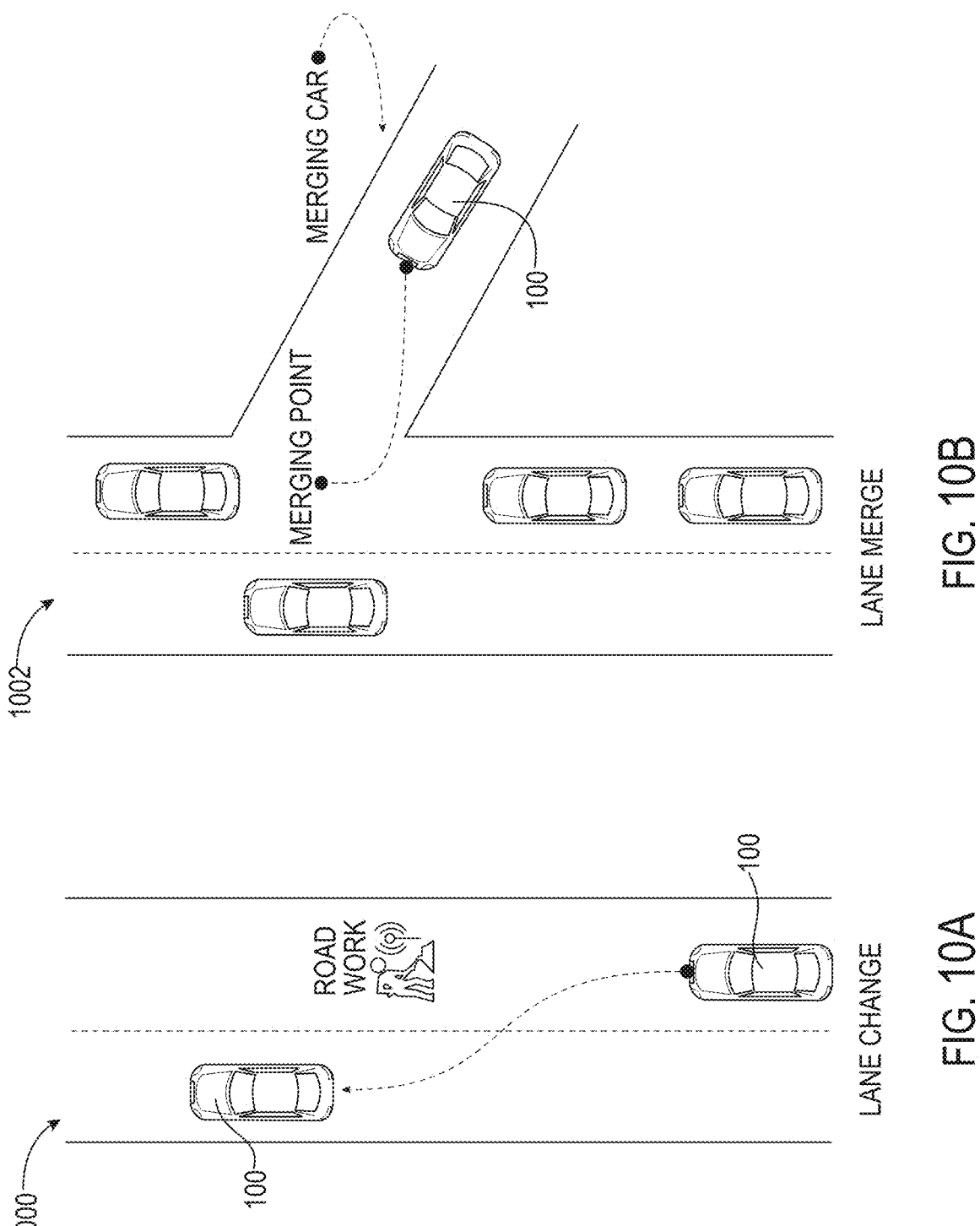
FIGS. 10A and 10B are diagrams of exemplary vehicle highway turns in the form of a lane change and merge onto a highway, respectively, wherein the steering wheel angle may not significantly change during the highway turn.

In other exemplary aspects, the automatic turn signal cancellation system 208 can also be configured to distinguish between a simple turn (e.g., a simple turn and/or roundabout as discussed above), as compared to highway turning for automatic turn signal cancellation. Highway turning is turning that does not necessarily involve sharp steering wheel angle A1 or A2 changes, such as when the vehicle 100 performs a highway lane change 1000 like shown in FIG. 10A or highway merging 1002 like shown in FIG. 10B, or even highway exiting. This is because less steering wheel angle A1 or A2 change is required to perform a turn in a vehicle at higher speeds than are generally present in highway driving. This is because the steering wheel angle A1 or A2 change needed to perform a given turn is inversely related to vehicle speed due to increased centripetal force and inertia of the vehicle 100 turn at higher speeds. Thus, in highway turning, the detection of steering wheel angle A1 or A2 used for detection of simple turns and/or roundabouts may not be significant enough to detect highway turning for automatic turn signal cancellation after the highway turn is completed.

Figure 11:
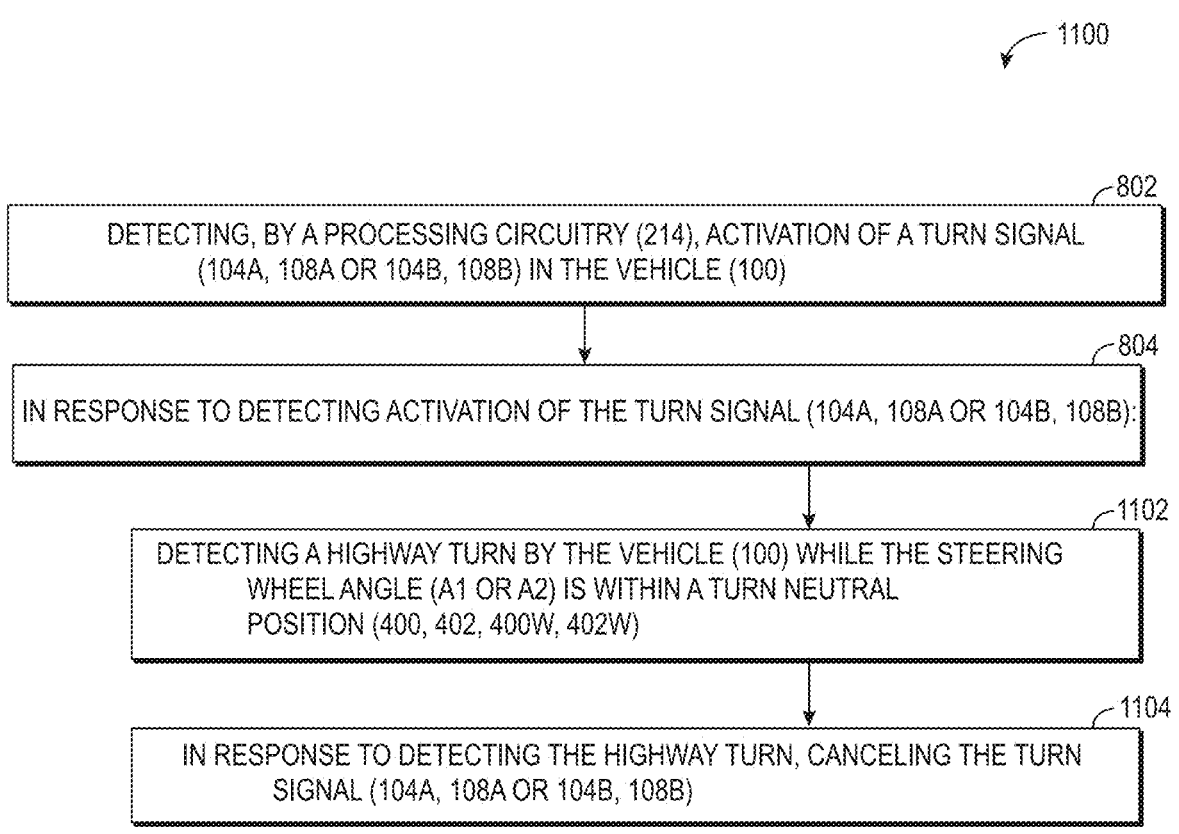
FIG. 11 is a flowchart illustrating an exemplary process of the dynamically-controlled automatic turn signal cancellation system in FIG. 2 also being configured to cancel a turn signal in response to detecting a highway turn when the steering wheel angle is not detected to change significantly enough to signify a vehicle turn.

Thus, in other exemplary aspects, to be able to cancel a turn signal after completion of a highway turn that is not detectable through the steering wheel angle A1 or A2 change based on exceeding the first threshold angle $\theta1$, $-\theta1$ (e.g., a dynamically set first threshold angle $\theta1$, $-\theta1$ based on vehicle speed), the processing circuitry 214 can also be configured to cancel the turn signal 104A, 108A or 104B, 108B based on detecting a highway turn using a secondary turn detection system, such as the secondary turn data system 230 in FIG. 2. For example, the secondary turn data system 230 may be a forward-looking camera (FLC) that can provide forward-looking images as part of the secondary turn data 232, that can be processed by the processing circuitry 214 to detect a highway turn by the vehicle 100 that may not otherwise be detectable using the steering wheel angle A1 or A2 change. In another alternative example, the secondary turn data system 230 could be a global-positioning system (GPS) wherein secondary turn data 232 is provided in the form of coordinate position or map data that can be used by the processing circuitry to detect a highway turn by the vehicle 100 that may not otherwise be detectable using the steering wheel angle A1 or wheel angle A2 change. In this regard, FIG. 11 is a flowchart illustrating an exemplary process 1100 of the automatic turn signal cancellation system 208 and/or its processing circuitry 214 in FIG. 2 also being configured to cancel a turn signal 104A, 108A or 104B, 108B of the vehicle 100 in response to detecting a highway turn by the vehicle when the change in the steering wheel angle A1 or A2 is not significant enough to be detected as a vehicle turn. As discussed above, to accurately provide other automatic turn signal cancellation using the steering wheel angle A1 or A2, the change in steering wheel angle A1 or A2 may have to be significant enough to distinguish an actual turn to prevent false turn signal cancellations. Common steps between the process 800 in FIG. 8 and the process 1100 in FIG. 11 are shown with common step numbers between FIG. 8 and FIG. 11.

As shown in FIG. 11, the processing circuitry 214 is configured to detect this activation of the turn signal 104A, 108A or 104B, 108B (e.g., based on the turn signal indicator 216 in FIG. 2) like in the process 800 in FIG. 8 (block 802 in FIG. 8). In response to the activation of the turn signal activator 106 (block 804 in FIG. 8), the processing circuitry 214 is configured to detect the steering wheel angle A1 or A2 related to turning of the steering wheel 202 of the vehicle 100 like in the process 800 in FIG. 8. Then, as shown in FIG. 11, the processing circuitry 214 is configured to detect a highway turn (e.g., a lane change, a highway merge, a highway exiting) by the vehicle 100 while the steering wheel angle A1 or A2 is within a turn neutral position 400, 402 or turn neutral angle window 400W, 402W, or before the steering wheel angle A1 or A2 exceeds the first threshold angle $\theta1$, $-\theta1$ (block 1102 in FIG. 11). The processing circuitry 214 can be configured to detect the highway turn using the secondary turn data 232 from the secondary turn data system 230 as discussed above. For example, the processing circuitry 214 may be configured to detect the highway turn by receiving one or more images (e.g., forward-looking images) from the secondary turn data 232 if the secondary turn data system 230 is a camera or imaging system (e.g., a forward-looking camera). As another example, the processing circuitry 214 may be configured to detect the highway turn by receiving secondary turn data 232 as GPS data if the secondary turn data system 230 is a GPS device. In response to detecting the highway turn of the vehicle 100, the processing circuitry 214 is configured to automatically cancel the activated turn signal 104A, 108A or 104B, 108B (block 1104 in FIG. 11).

Note that any of the stability times discussed herein can be preset or programmed/re-programmed to a fixed time value. Any of the threshold angles or stability times discussed herein can be dynamically set or adjusted based on vehicle 100 conditions, including but not limited to vehicle speed. For example, any of the stability times discussed herein could be dynamically determined related (e.g., inversely related) to the maximum steering wheel angle A1 or A2 of the turn. In other words, the larger the steering wheel 202 motion of the turn, the smaller the stability time used to determine what steering wheel 202 stability and turn completion will be. This is because a steering wheel 202 will generally return to a stable position (e.g., turn neutral position 400) after turn completion in a shorter period of time (e.g., <=1.6 seconds) when recovering from a larger steering wheel 202 motion from a sharper turn (i.e., the steering wheel angle recovery has a larger slope) than from a smaller steering wheel 202 motion from a lighter turn (e.g., <=3 seconds) (i.e., the steering wheel angle recovery has a smaller slope). Vehicles are designed to require more steering wheel force for sharp turns for stability and safety, which then causes the steering wheel 202 to recover to a turn neutral position more quickly for sharp turns as opposed to light turns. The turn neutral positions 400, 402 and turn neutral angle windows 400W, 402(W) 402W can be preset, programmed and/or or dynamically determined, and any can be used in the performance of the processes discussed herein.

Figure 12:
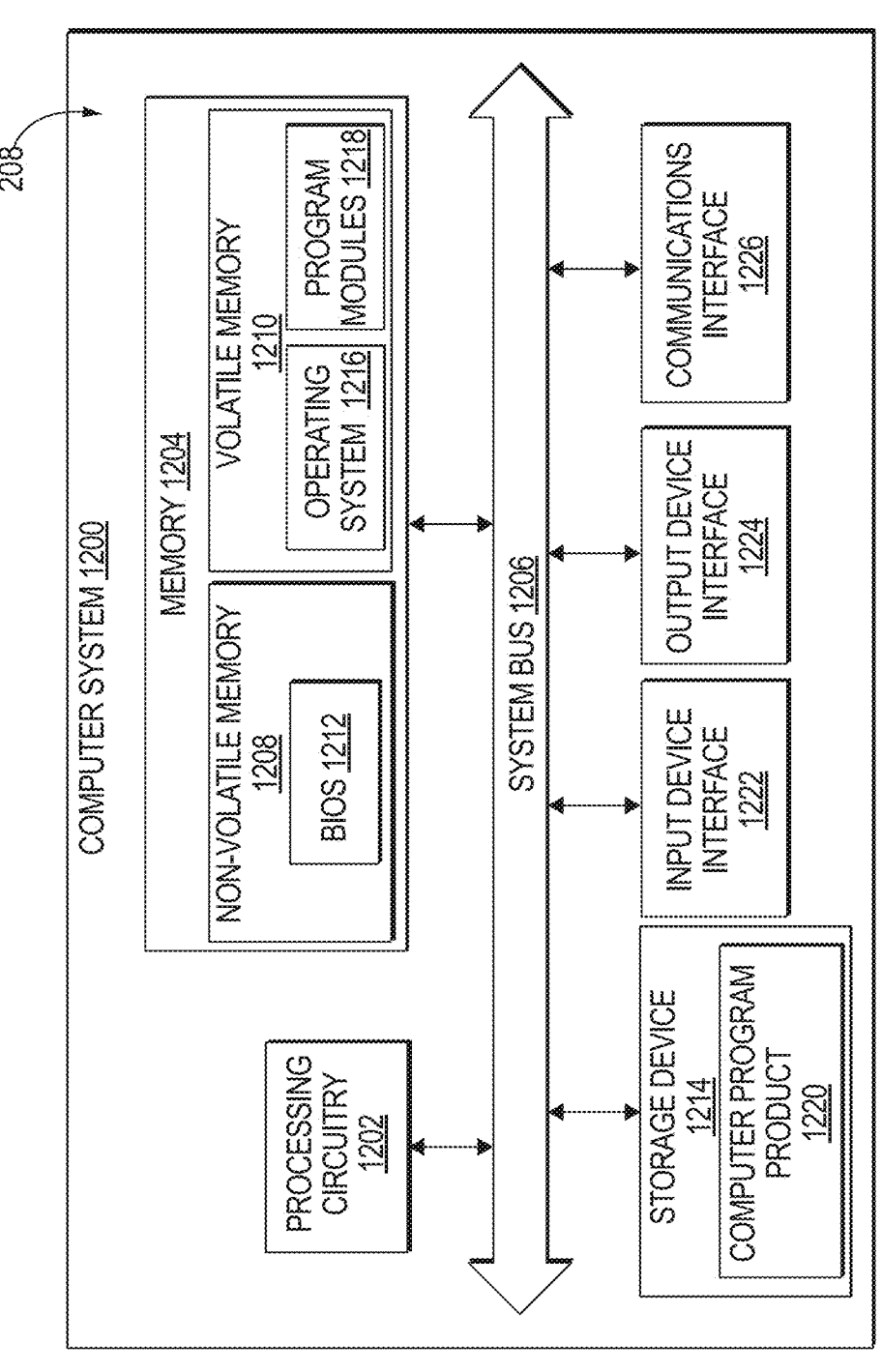
FIG. 12 is a block diagram of an exemplary computer system that can be included in an automatic turn signal cancellation system, including but not limited to the automatic turn signal cancellation system in FIG. 2, configured to automatically cancel a turn signal when a roundabout is truly exited based on detecting an initial turn signal in the opposite direction of the entry turn direction into the roundabout, and a further turn signaling pattern with certain vehicle turning that may indicate a roundabout driving pattern and roundabout exit.

FIG. 12 is a block diagram of an exemplary computer system 1200 that can be included in an automatic turn signal cancellation system, including but not limited to the automatic turn signal cancellation system 208 and/or its processing circuitry 214 in FIG. 2, configured to automatically cancel a turn signal based on determining when a roundabout is truly exited based on detecting an initial turn signal in the opposite direction of the entry turn direction into the roundabout, and a further turn signaling pattern with certain vehicle turning that may indicate a roundabout driving pattern and roundabout exit.

The computer system 1200 is adapted to execute instructions from a computer-readable medium to perform these and/or any of the functions or processing described herein. The computer system 1200 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 1200 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), automatic turn signal cancellation system, processor device, processing circuitry, etc., includes reference to one or more such devices to individually or jointly execute a set (or multiple sets) of instructions to perform any one or more of the methodologies discussed herein. For example, a control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1200 may comprise at least one computing device or electronic device capable of including firmware, hardware, and/or executing software instructions to implement the functionality described herein. The computer system 1200 may include processing circuitry 1202 (e.g., processing circuitry including one or more processor devices or control units) that could be the processing circuitry 214 in the automatic turn signal cancellation system 208 in FIG. 2. The computer system 1200 also includes a memory 1204 (that could be or include the memory 220 in FIG. 2) and a system bus 1206. The computer system 1200 may include at least one computing device having the processing circuitry 1202. The system bus 1206 provides an interface for system components including, but not limited to, the memory 1204 and the processing circuitry 1202. The processing circuitry 1202 may include any number of hardware components for conducting data or signal processing or for executing computer code stored in memory 1204, including the computer instructions 218 executed by the processing circuitry 214 in the automatic turn signal cancellation system 208 in FIG. 2. The processing circuitry 1202 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1202 may further include computer executable code that controls operation of the programmable device.

The system bus 1206 may be any of several types of bus structures that may further interconnect to a memory bus (with or without a memory controller), a peripheral bus, and/or a local bus using any of a variety of bus architectures. The memory 1204 may be one or more devices for storing data and/or computer code for completing or facilitating methods described herein. The memory 1204 may include database components, object code components, script components, or other types of information structure for supporting the various activities herein. Any distributed or local memory device may be utilized with the systems and methods of this description. The memory 1204 may be communicably connected to the processing circuitry 1202 (e.g., via a circuit or any other wired, wireless, or network connection) and may include computer code for executing one or more processes described herein. The memory 1204 may include non-volatile memory 1208 (e.g., read-only memory (ROM), erasable programmable read-only memory (EPROM), electrically erasable programmable read-only memory (EEPROM), etc.), and volatile memory 1210 (e.g., random-access memory (RAM)), or any other medium which can be used to carry or store desired program code in the form of machine-executable instructions or data structures and which can be accessed by a computer or other machine with processing circuitry 1202. A basic input/output system (BIOS) 1212 may be stored in the non-volatile memory 1208 and can include the basic routines that help to transfer information between elements within the computer system 1200.

The computer system 1200 may further include or be coupled to a non-transitory computer-readable storage medium such as a storage device 1214, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1214 and other drives associated with computer-readable media and computer-usable media may provide non-volatile storage of data, data structures, computer-executable instructions (e.g., computer instructions 218), and the like.

Computer-code which is hard or soft coded may be provided in the form of one or more modules. The module(s) can be implemented as software and/or hard-coded in circuitry to implement the functionality described herein in whole or in part. The modules may be stored in the storage device 1214 and/or in the volatile memory 1210, which may include an operating system 1216 and/or one or more program modules 1218. All or a portion of the examples disclosed herein may be implemented as a computer program 1220 stored on a transitory or non-transitory computer-usable or computer-readable storage medium (e.g., single medium or multiple media), such as the storage device 1214, which includes complex programming instructions (e.g., complex computer-readable program code) to cause the processing circuitry 1202 to carry out actions described herein. Thus, the computer-readable program code of the computer program 1220 can comprise software instructions (e.g., computer instructions 218) for implementing the functionality of the examples described herein when executed by the processing circuitry 1202. In some examples, the storage device 1214 may be a computer program product (e.g., readable storage medium) storing the computer program 1220 thereon, where at least a portion of a computer program 1220 may be loadable (e.g., into a processor) for implementing the functionality of the examples described herein when executed by the processing circuitry 1202. The processing circuitry 1202 may serve as a controller or control system for the computer system 1200 that is to implement the functionality described herein.

The computer system 1200 may include an input device interface 1222 configured to receive input and selections to be communicated to the computer system 1200 when executing instructions, such as from a keyboard, mouse, touch-sensitive surface, etc. Such input devices may be connected to the processing circuitry 1202 through the input device interface 1222 coupled to the system bus 1206 but can be connected through other interfaces, such as a parallel port, an Institute of Electrical and Electronic Engineers (IEEE) 1394 serial port, a Universal Serial Bus (USB) port, an IR interface, and the like. The computer system 1200 may include an output device interface 1224 configured to forward output, such as to a display, a video display unit (e.g., a liquid crystal display (LCD) or a cathode ray tube (CRT)). The computer system 1200 may include a communications interface 1226 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Implementation examples are described in the following numbered clauses:

Example 1: An automatic turn signal cancellation system comprising processing circuitry configured to:

detect activation of a first turn signal in a first turn direction in a vehicle; and in response to detecting activation of the first turn signal in the first turn direction:

detect first turning of the vehicle towards a second turn direction opposite of the first turn direction; and in response to detecting the first turning of the vehicle towards the second turn direction:

detect the vehicle entering a first turn neutral position relative to a neutral position of the vehicle; and in response to detecting the vehicle entering the first turn neutral position:

detect activation of a second turn signal in the second turn direction; and in response to detecting the activation of the second turn signal in the second turn direction: detect the vehicle entering a second turn neutral position relative to the neutral position of the vehicle; and in response to detecting the vehicle entering the second turn neutral position: detect the vehicle remaining in the first turn neutral position for a first stability time; and in response to detecting the vehicle remaining in the first turn neutral position for the first stability time, cancel the second turn signal.

Example 2: The automatic turn signal cancellation system of Example 1, wherein the processing circuitry is further configured to not cancel the first turn signal in response to detecting the first turning of the vehicle towards the second turn direction.

Example 3: The automatic turn signal cancellation system of any of Examples 1-2, wherein the processing circuitry is configured to detect the first turning of the vehicle towards the second turn direction by being configured to detect a wheel angle of the vehicle exceeding a threshold angle towards the second turn direction.

Example 4: The automatic turn signal cancellation system of Example 3, wherein the processing circuitry is further configured to, in response to detecting activation of the first turn signal in the first turn direction: detect a speed of the vehicle; and set the threshold angle based on the detected speed of the vehicle.

Example 5: The automatic turn signal cancellation system of any of Examples 1-4, wherein the processing circuitry is configured to detect the vehicle entering the first turn neutral position by being configured to: detect a wheel angle of the vehicle crossing into a first turn neutral angle window relative to a neutral position of the wheel angle of the vehicle.

Example 6: The automatic turn signal cancellation system of Example 5, wherein the first turn neutral angle window is +/−1.0 radian relative to the neutral position of the wheel angle.

Example 7: The automatic turn signal cancellation system of any of Examples 1-6, wherein the processing circuitry is further configured to, in response to detecting activation of the first turn signal in the first turn direction: detect turning of the vehicle towards the first turn direction; and in response to detecting turning of the vehicle towards the first turn direction: detect the vehicle remaining in the first turn neutral position for the second stability time; and in response to the vehicle remaining in the first turn neutral position for the second stability time, cancel the first turn signal.

Example 8: The automatic turn signal cancellation system of any of Examples 1-7, wherein the processing circuitry is configured to detect the vehicle entering the second turn neutral position by being configured to: detect a steering wheel angle of a steering wheel of the vehicle entering to a second turn neutral angle window relative to a neutral position of the steering wheel.

Example 9: The automatic turn signal cancellation system of Example 8, wherein the second turn neutral angle window is +/−0.2 radians relative to the neutral position of the steering wheel.

Example 10: The automatic turn signal cancellation system of any of Examples 1-9, wherein the first stability time is 1.5 seconds.

Example 11: The automatic turn signal cancellation system of any of Examples 1-10, wherein the processing circuitry is further configured to:

detect the first turning of the vehicle towards the second turn direction before detecting the activation of the first turn signal; and in response to detecting the first turning of the vehicle towards the second turn direction before detecting the activation of the first turn signal:

detect the vehicle entering the first turn neutral position; and in response to detecting the vehicle entering the first turn neutral position:

detect activation of a third turn signal in the second turn direction; and in response to detecting activation of the third turn signal in the second turn direction:

detect the vehicle entering a third turn neutral position relative to the neutral position of the vehicle; and in response to detecting the vehicle entering the third turn neutral position: detect the vehicle remaining in the third turn neutral position for a third stability time; and in response to detecting the vehicle remaining in the third turn neutral position for the third stability time, cancel the third turn signal.

Example 12: The automatic turn signal cancellation system of Example 11, wherein the third stability time is four (4) seconds.

Example 13: The automatic turn signal cancellation system of any of Examples 10-12, wherein the processing circuitry is further configured to, in response to detecting the steering wheel angle not remaining in the third turn neutral position for the third stability time, not cancel the third turn signal.

Example 14: The automatic turn signal cancellation system of any of Examples 10-13, wherein the processing circuitry is configured to:

detect the first turning of the vehicle towards the second turn direction by being configured to:

detect a wheel angle of the vehicle exceeding a threshold angle towards the second turn direction;

detect the vehicle entering the first turn neutral position by being configured to:

detect a wheel angle of the vehicle entering the first turn neutral position comprising a first turn neutral angle window relative to a neutral position of the wheel angle of the vehicle; and detect the vehicle entering the third turn neutral position by being configured to:

detect a steering wheel angle of the steering wheel of the vehicle entering the third turn neutral position relative to the neutral position of the steering wheel; and detect the vehicle remaining in the third turn neutral position for the third stability time by being configured to:

detect the steering wheel angle remaining in the third turn neutral position for the third stability time.

Example 15: The automatic turn signal cancellation system of any of Examples 1-14, wherein, in response to activation of the first turn signal, the processing circuitry is further configured to: detect a highway turn by the vehicle while the vehicle is within a fourth turn neutral position; and in response to detecting the highway turn, cancel the first turn signal.

Example 16: The automatic turn signal cancellation system of Example 15, wherein the processing circuitry is configured to detect the highway turn by being configured to: receive at least one image from an imaging system; and determine whether the highway turn occurred based on the received at least one image.

Example 17: The automatic turn signal cancellation system of Example 16, wherein the imaging system comprises a forward-looking camera configured to capture images of a forward-looking perspective from the vehicle.

Example 18: The automatic turn signal cancellation system of Example 15, wherein the processing circuitry is configured to detect the highway turn by being configured to: receive turn data of the vehicle generated by a global-positioning system (GPS); and determine whether the highway turn occurred based on the received turn data.

Example 19: A vehicle comprising the automatic turn signal cancellation system of any of Examples 1-18.

Example 20: The vehicle of Example 19, further comprising a steering wheel angle sensor configured to generate a steering wheel angle signal indicative of the steering wheel angle of the steering wheel.

Example 21: A method of automatically cancelling a turn signal for a vehicle from a roundabout, comprising:

detecting, by a processing circuitry, activation of a first turn signal in a first turn direction in a vehicle; and in response to detecting, by the processing circuitry, activation of the first turn signal in the first turn direction:

detecting, by the processing circuitry, first turning of the vehicle towards a second turn direction opposite of the first turn direction; and in response to detecting, by the processing circuitry, the first turning of the vehicle towards the second turn direction:

detecting, by the processing circuitry, the vehicle entering a first turn neutral position relative to the neutral position of the steering wheel; and in response to detecting, by the processing circuitry, the vehicle entering the first turn neutral position:

detecting, by the processing circuitry, activation of a second turn signal in the second turn direction; and in response to the processing circuitry detecting, by the processing circuitry, the activation of the second turn signal in the second turn direction:

detecting, by the processing circuitry, the vehicle entering a second turn neutral position relative to the neutral position of the steering wheel; and in response to detecting, by the processing circuitry, the vehicle entering the second turn neutral position:

detecting, by the processing circuitry, the vehicle remaining in the first turn neutral position for a first stability time; and in response to detecting, by the processing circuitry, the vehicle remaining in the first turn neutral position for the first stability time, cancelling, by the processing circuitry, the second turn signal.

Example 22: The method of Example 21, further comprising:

detecting, by the processing circuitry, the first turning of the vehicle towards the second turn direction before detecting the activation of the first turn signal; and in response to the detecting, by the processing circuitry, the first turning of the vehicle towards the second turn direction before detecting the activation of the first turn signal:

detecting, by the processing circuitry the vehicle entering the first turn neutral position; and in response detecting, by the processing circuitry, the vehicle entering the first turn neutral position:

detecting, by the processing circuitry activation of a third turn signal in the second turn direction; and in response detecting, by the processing circuitry, activation of the third turn signal in the second turn direction:

detecting, by the processing circuitry the vehicle entering a third turn neutral position relative to the neutral position of the vehicle; and in response to detecting, by the processing circuitry, the vehicle entering the third turn neutral position:

detecting, by the processing circuitry, the vehicle remaining in the third turn neutral position for a third stability time; and in response to detecting, by the processing circuitry, the vehicle remaining in the third turn neutral position for the third stability time, cancelling, by the processing circuitry, the third turn signal.

Example 23: The method of any of Examples 21-22, wherein, in response to activation of the first turn signal, further comprising: detecting, by the processing circuitry, a highway turn by the vehicle while the vehicle is within a fourth turn neutral position; and in response to detecting, by the processing circuitry, the highway turn, cancelling, by the processing circuitry the first turn signal.

Example 24: A computer program product comprising program code for performing, when executed by the processing circuitry, the method of Example 21.

Example 25: A non-transitory computer-readable storage medium comprising instructions, which, when executed by the processing circuitry, cause the processing circuitry to perform the method of Example 21.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An automatic turn signal cancellation system comprising processing circuitry configured to:
   detect activation of a first turn signal in a first turn direction in a vehicle; and
   in response to detecting activation of the first turn signal in the first turn direction:
      detect first turning of the vehicle towards a second turn direction opposite of the first turn direction; and
      in response to detecting the first turning of the vehicle towards the second turn direction:
         detect the vehicle entering a first turn neutral position relative to a neutral position of the vehicle; and
         in response to detecting the vehicle entering the first turn neutral position:
            detect activation of a second turn signal in the second turn direction; and
            in response to detecting the activation of the second turn signal in the second turn direction:

detect the vehicle entering a second turn neutral position relative to the neutral position of the vehicle; and
            in response to detecting the vehicle entering the second turn neutral position:
               detect the vehicle remaining in the first turn neutral position for a first stability time; and
               in response to detecting the vehicle remaining in the first turn neutral position for the first stability time, cancel the second turn signal.

2. The automatic turn signal cancellation system of claim 1, wherein the processing circuitry is further configured to not cancel the first turn signal in response to detecting the first turning of the vehicle towards the second turn direction.

3. The automatic turn signal cancellation system of claim 1, wherein the processing circuitry is further configured to, in response to detecting activation of the first turn signal in the first turn direction:
   detect turning of a steering wheel towards the first turn direction; and
   in response to detecting turning of the steering wheel towards the first turn direction:
      determine whether the vehicle returns to the first turn neutral position; and
      in response to the vehicle returning to the first turn neutral position, cancel the first turn signal.

4. The automatic turn signal cancellation system of claim 1, wherein the first turn neutral position comprises a first turn neutral angle window.

5. The automatic turn signal cancellation system of claim 1, wherein the processing circuitry is configured to detect the first turning of the vehicle towards the second turn direction by being configured to:
   detect a wheel angle of the vehicle exceeding a threshold angle towards the second turn direction.

6. The automatic turn signal cancellation system of claim 5, wherein the processing circuitry is further configured to, in response to detecting activation of the first turn signal in the first turn direction:
   detect a speed of the vehicle; and
   set the threshold angle based on the detected speed of the vehicle.

7. The automatic turn signal cancellation system of claim 1, wherein the processing circuitry is configured to detect the vehicle entering the first turn neutral position by being configured to:
   detect a wheel angle of the vehicle crossing into a first turn neutral angle window relative to a neutral position of the wheel angle of the vehicle.

8. The automatic turn signal cancellation system of claim 7, wherein the first turn neutral angle window is +/−1.0 radian relative to the neutral position of the wheel angle.

9. The automatic turn signal cancellation system of claim 1, wherein the processing circuitry is further configured to, in response to detecting activation of the first turn signal in the first turn direction:
   detect turning of the vehicle towards the first turn direction; and
   in response to detecting turning of the vehicle towards the first turn direction:
      detect the vehicle remaining in the first turn neutral position for a second stability time; and
      in response to the vehicle remaining in the first turn neutral position for the second stability time, cancel the first turn signal.

10. The automatic turn signal cancellation system of claim 1, wherein the processing circuitry is configured to detect the vehicle entering the second turn neutral position by being configured to:

detect a steering wheel angle of a steering wheel of the vehicle entering a second turn neutral angle window relative to a neutral position of the steering wheel.

11. The automatic turn signal cancellation system of claim 10, wherein the second turn neutral angle window is +/−0.2 radians relative to the neutral position of the steering wheel.

12. The automatic turn signal cancellation system of claim 1, wherein the first stability time is 1.5 seconds.

13. The automatic turn signal cancellation system of claim 1, wherein the processing circuitry is further configured to:

detect the first turning of the vehicle towards the second turn direction before detecting the activation of the first turn signal; and in response to detecting the first turning of the vehicle towards the second turn direction before detecting the activation of the first turn signal:

detect the vehicle entering the first turn neutral position; and in response to detecting the vehicle entering the first turn neutral position:

detect activation of a third turn signal in the second turn direction; and in response to detecting activation of the third turn signal in the second turn direction:

detect the vehicle entering a third turn neutral position relative to the neutral position of the vehicle; and in response to detecting the vehicle entering the third turn neutral position:

detect the vehicle remaining in the third turn neutral position for a third stability time; and in response to detecting the vehicle remaining in the third turn neutral position for the third stability time, cancel the third turn signal.

14. The automatic turn signal cancellation system of claim 13, wherein the processing circuitry is configured to:

detect the first turning of the vehicle towards the second turn direction by being configured to:

detect a wheel angle of the vehicle exceeding a threshold angle towards the second turn direction;

detect the vehicle entering the first turn neutral position by being configured to:

detect a wheel angle of the vehicle entering the first turn neutral position comprising a first turn neutral angle window relative to a neutral position of the wheel angle of the vehicle; and detect the vehicle entering the third turn neutral position by being configured to:

detect a steering wheel angle of the steering wheel of the vehicle entering the third turn neutral position relative to the neutral position of the steering wheel; and detect the vehicle remaining in the third turn neutral position for the third stability time by being configured to:

detect the steering wheel angle remaining in the third turn neutral position for the third stability time.

15. The automatic turn signal cancellation system of claim 1, wherein, in response to activation of the first turn signal, the processing circuitry is further configured to:

detect a highway turn by the vehicle while the vehicle is within a fourth turn neutral position; and in response to detecting the highway turn, cancel the first turn signal.

16. The automatic turn signal cancellation system of claim 15, wherein the processing circuitry is configured to detect the highway turn by being configured to:

receive at least one image from an imaging system; and determine whether the highway turn occurred based on the received at least one image.

17. The automatic turn signal cancellation system of claim 16, wherein the imaging system comprises a forward-looking camera configured to capture images of a forward-looking perspective from the vehicle.

18. The automatic turn signal cancellation system of claim 15, wherein the processing circuitry is configured to detect the highway turn by being configured to:

receive turn data of the vehicle generated by a global-positioning system (GPS); and determine whether the highway turn occurred based on the received turn data.

19. A vehicle comprising the automatic turn signal cancellation system of any of claim 1.

20. A method of automatically cancelling a turn signal for a vehicle from a roundabout, comprising:

detecting, by a processing circuitry, activation of a first turn signal in a first turn direction in a vehicle; and in response to detecting, by the processing circuitry, activation of the first turn signal in the first turn direction:

detecting, by the processing circuitry, first turning of the vehicle towards a second turn direction opposite of the first turn direction; and in response to detecting, by the processing circuitry, the first turning of the vehicle towards the second turn direction:

detecting, by the processing circuitry, the vehicle entering a first turn neutral position relative to a neutral position of a steering wheel; and in response to detecting, by the processing circuitry, the vehicle entering the first turn neutral position:

detecting, by the processing circuitry, activation of a second turn signal in the second turn direction; and in response to the processing circuitry detecting, by the processing circuitry, the activation of the second turn signal in the second turn direction:

detecting, by the processing circuitry, the vehicle entering a second turn neutral position relative to the neutral position of the steering wheel; and in response to detecting, by the processing circuitry, the vehicle entering the second turn neutral position:

detecting, by the processing circuitry, the vehicle remaining in the first turn neutral position for a first stability time; and in response to detecting, by the processing circuitry, the vehicle remaining in the first turn neutral position for the first stability time, cancelling, by the processing circuitry, the second turn signal.

* * * * *